United States Patent
Mitchell et al.

(10) Patent No.: US 7,254,272 B2
(45) Date of Patent: Aug. 7, 2007

(54) BROWSING JPEG IMAGES USING MPEG HARDWARE CHIPS

(75) Inventors: Joan L. Mitchell, Longmont, CO (US); Neil M. Leeder, Cary, NC (US); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 10/644,962

(22) Filed: Aug. 21, 2003

(65) Prior Publication Data
US 2005/0047666 A1  Mar. 3, 2005

(51) Int. Cl.
G06K 9/36 (2006.01)
G06K 9/00 (2006.01)

(52) U.S. Cl. .................................... 382/233
(58) Field of Classification Search ................ 382/232, 382/233, 250, 251, 253; 370/263, 465; 345/440, 345/565, 572; 348/14.09, 405.1, 408, 441, 348/552
See application file for complete search history.

(56) References Cited

U.S. PATENT DOCUMENTS

| | | | | |
|---|---|---|---|---|
| 5,165,103 A | * | 11/1992 | Takeda et al. | 382/305 |
| 5,170,445 A | * | 12/1992 | Nelson et al. | 382/233 |
| 5,229,863 A | * | 7/1993 | Kao et al. | 358/426.03 |
| 5,604,540 A | | 2/1997 | Howe | |
| 5,699,458 A | | 12/1997 | Sprague | |
| 5,818,607 A | * | 10/1998 | Nakamura et al. | 358/426.05 |
| 5,821,945 A | | 10/1998 | Yeo et al. | |
| 5,838,664 A | | 11/1998 | Polomski | |
| 5,900,865 A | | 5/1999 | Howe | |
| 6,542,640 B1 | * | 4/2003 | Morihara et al. | 382/229 |
| 7,039,245 B1 | * | 5/2006 | Hamery | 382/233 |
| 7,085,419 B2 | * | 8/2006 | Akiyoshi et al. | 382/232 |
| 2003/0048956 A1 | * | 3/2003 | Mitchell et al. | 382/250 |

* cited by examiner

*Primary Examiner*—Amir Alavi
(74) *Attorney, Agent, or Firm*—Whitham, Curtis, Christofferson & Cook, P.C.; William H. Steinberg

(57) ABSTRACT

Rapid throughput of still image compressed data (e.g. JPEG) is achieved for presentation of images in rapid succession for browsing or browsing by panning within large images by using a hardware decoder adapted for presentation of moving images to reduce the processing load which must be performed in accordance with software although the still image data is incompatible with still image data in many respects; some of which necessarily lead to a loss of image fidelity. The still image data is partially decoded (e.g. entropy decoded) in software processing and re-encoded and reformatted to a form which can at least be accepted by the hardware decoder even though not compliant with any particular moving picture data standard (e.g. MPEG). Storage in the hardware decoder is reallocated to provide, in combination with a reduction of slower software processing, a throughput increase of four-fold or more. Software processing of the still image data is also allowed to proceed and the result substituted for the result of the hardware decoding if a given image is viewed for a time sufficient for the software image processing to be completed.

16 Claims, 19 Drawing Sheets

| N,FZKlast | DC | [ZRL, 0xn0] | RS, E1 | [E2, 0x00] | ..... | EOB, 0x-- | [0x----] |

*Figure 4*

BROWSING JPEG IMAGES USING MPEG HARDWARE CHIPS

BACKGROUND OF THE INVENTION

1. Field of the Invention

The present invention generally relates to data processing for the digital transmission, storage, retrieval and display of arbitrary images and, more particularly to the rapid decoding of images from digital data for presentation in potentially rapid sequence.

2. Description of the Prior Art

Pictorial and graphics images contain extremely large amounts of data and, if digitized to allow transmission or processing by digital data processors and exploitation of various benefits of digital transmission, such as increased noise immunity and error recovery, often require many millions of bytes to represent respective pixels of the image or graphics with good fidelity. The sheer quantity of data in images therefore presents a severe processing burden. However, pictorial data is often susceptible to substantial data compression without significant loss of image fidelity. That is, image data compression often allows representation of images with less data in order to save storage costs or transmission time and costs with little or no perceptible effect on image fidelity.

The most effective compression is achieved by approximating the original image, rather than reproducing it exactly. The JPEG standard, discussed in detail in "JPEG Still Image Data Compression Standard" by Pennebaker and Mitchell, published by Van Nostrand Reinhold, 1993, which is hereby fully incorporated by reference, allows the interchange of images between diverse applications and provides the capability of producing digital continuous-tone color images in multi-media applications.

JPEG is primarily concerned with images that have two spatial dimensions, contain gray scale or color information, and possess no temporal dependence, as distinguished from the MPEG (Moving Picture Experts Group) standard. JPEG compression can reduce the storage requirements by more than an order of magnitude and improve system response time in the process. A primary goal of the JPEG standard is to provide the maximum image fidelity for a given volume of data and/or available transmission bandwidth or processing time and any arbitrary degree of data compression can be accommodated although, depending on image content, data compression may be limited by loss of the image detail or features of interest. However, it is often the case that data compression by a factor of twenty or more (and reduction of transmission or processing time and storage capacity by a comparable factor) will not produce artifacts which are noticeable to the average viewer.

The JPEG standard should be viewed as a family of compression techniques which have different properties and imply different advantages in regard to hardware requirements, processing time and the like. Since maximum preservation of image fidelity relative to image data file size and the flexibility to customize compression techniques to exploit characteristics of image content are principal goals of the JPEG standard, encoding and decoding may be computationally intensive and require significant amounts of time for a single image, particularly since JPEG coding and decoding is usually carried out in software (since it is generally efficient to download the particular portion of JPEG corresponding to the image content with the image rather than to determine the particular JPEG family member with the properties best corresponding to image and file content from resident software or hardware) and the higher speeds of special purpose chips are not generally available to most users. Therefore, the JPEG standard also allows various modes of operation such as are referred to as sequential or progressive in order to more quickly present a portion of the image or the full image at reduced resolution (increasing over time), respectively, so that the image may be more quickly identified and processing terminated and begun on another image if it is determined that a particular image is not of interest upon viewing of a partially decoded image. Iterating through a sequence of images is often referred to as browsing.

It can be appreciated that when a person may wish to look through a group of hard-copy images, such as photographs, each image may be viewed for only a fraction of a second in order to find and/or select an image of interest. It is desirable to be able to provide a similar capability in displaying images from digital data. Therefore, it has been the practice to use sequential or progressive operation of JPEG standard compression techniques to deliver an increasing fraction of the image at full detail or the full image at increasing resolution so that an image which is not desired can be rejected as soon as it is recognizable by the viewer. However, software implementations of JPEG processing may not allow the frequency of image presentation to be acceptably high consistent with providing images adequate for recognition.

The situation is somewhat different under the MPEG standard which must support image frame rates above the flicker fusion frequency of human visual perception. To do so, additional compression is provided by exploiting data which remains constant between frames, image motion sensing and prediction for interpolation to reduce decoding demands and the like. The subject matter of the data for which MPEG compression is used will also generally include long sequences of related images such as are presented in a motion picture which is marketed to subscribers. Therefore, the intended market economically supports the widespread availability of set-top boxes (STBs) including special purpose data processing chips capable of very fast decoding and presentation of images.

However, MPEG decoders and the MPEG standard itself are not well-adapted to decoding of sequences of independent images (even though independent "I-frame" images are periodically decoded, with intra-coded B-frames and P-frames between them, in accordance with the MPEG standard) and cannot be directly used for single images encoded under the JPEG standard while preserving the detail and fidelity desired in single images. In fact, since the anticipated applications for JPEG and MPEG were quite different when those standards were promulgated, incompatibilities between the coding techniques were tolerated such that transcoding from JPEG to MPEG data was not considered practical or even possible without unacceptable reduction of image quality even though MPEG to JPEG transcoding was supported.

For example, so-called "oddification" (described at page 272 of "MPEG Video Compression Standard", published by Chapman & Hall, New York, N.Y., 1997, which is hereby fully incorporated by reference) provided in the MPEG standard unavoidably leads to a reduction in image fidelity in any transcoding from JPEG to MPEG. Therefore, while economically justifiable, the utility of special purpose moving picture decoder chips and STBs is quite limited relative to the amount of compressed digital image data and digitized and compressed libraries of images currently available and foreseeable.

Many libraries of images have been developed in which rapid browsing is desirable. In addition to increased use of digital electronic cameras by individuals and which present many advantages over film cameras (not the least of which encourages the generation of increased numbers of images, many of which may be later discarded and storage space reused), electronic files are being increasingly used to archive and provide rapid access to large quantities of documents, such as personal checks, negotiable certificates, legal records and the like. Among such documents, a person may wish to browse images based on an arbitrarily located area such as check number or payee. The location of this information in the image may be inconsistent with progressive (since detail is not immediately available) or sequential (since the region of interest may not be near the top of the document) JPEG operation. Further, in such a cases the nature of the browsing done may require even less viewing time per image that can be conveniently allowed to determine that a particular image is not of interest.

In summary, while JPEG processing provides optimal single image quality for a given data volume, it is only widely available in software implementations that do not support desired image presentation frequencies for browsing or full image presentation or full resolution at presentation rates (or throughput in regard to, for example, decoding of a single image or several images which may each be very large) approaching those frequencies. Current applications do not economically support widespread availability of special purpose hardware to increase JPEG encoded image presentation speed notwithstanding the development of many libraries which would most desirably be accessed by browsing. Widely available MPEG hardware capable of suitably high image presentation frequency is not compatible with JPEG encoded data and, at the present state of the art, transcoding from JPEG to MPEG is considered to be impractical and to lead to unavoidable and generally unacceptable reduction in image fidelity, particularly if the transcoding process is lossy.

In this regard, transcoding of incompatible formats for lossless data compression is known. FIG. 5-17 on page 77 of the above-incorporated JPEG text illustrates transcoding between the Huffman and Arithmetic entropy coders for the JPEG standard. Converting the Group 3 facsimile standard into the better compressing Group 4 facsimile standard has been often done once the error recovering built into the Group 3 standard is not needed (e.g. inside computer systems). Karl M. Marks, ("A JBIG-ABIC compression engine for digital document processing," IBM Journal of Research and Development, Vol 42, No. 6 pp. 753-758 (November 1998)) describes a chip that can encode or decode the bi-level image compression algorithms JBIG and ABIC. Thus conversion between them was made easy. The worst case for JBIG was not acceptable and so temporary storage of the documents converted into the ABIC version was preferred.

SUMMARY OF THE INVENTION

It is therefore an object of the present invention to provide for rapid browsing of digitally encoded images at presentation rates or throughput comparable to or exceeding rates for browsing of hard copy images such as photographs.

It is another object of the invention to provide a technique for transcoding JPEG data to a form which can be decoded by MPEG decoders without significant loss of image fidelity.

It is a further object of the present invention to extend the utility of special purpose moving image decoder devices such as MPEG STBs to the decoding of high quality still images.

It is yet another object of the invention to browse within a JPEG image that contains many more pixels than the output device by shifting the field of view within the image, much in the manner of panning a camera.

In order to accomplish these and other objects of the invention, a method for improving decoding throughput of compressed image data is provided comprising steps of partially decompressing the compressed image data which is incompatible with a hardware image decoder to form partially decompressed data in an intermediate code, recompressing the intermediate code in accordance with a compressed format compatible with the hardware image decoder to form recompressed image data, and decoding the recompressed image data with a hardware image decoder, whereby software processing for decoding the compressed image data is reduced by hardware decoding of the recompressed image data.

In accordance with another aspect of the invention, a method for viewing images is provided comprising steps of providing image data representing a plurality of images in a first data format, transcoding data in the first data format to a second data format accommodated by a hardware decoder, decoding the data in the second format in parallel with transcoding data in the first format, and substituting image data decoded from the data in the first format for image data decoded from the data in the second format after completion of the transcoding of data from the first format.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a schematic illustration of a JPEG packed block structure preferred for use in the invention.

DETAILED DESCRIPTION OF A PREFERRED EMBODIMENT OF THE INVENTION

Figure 1:
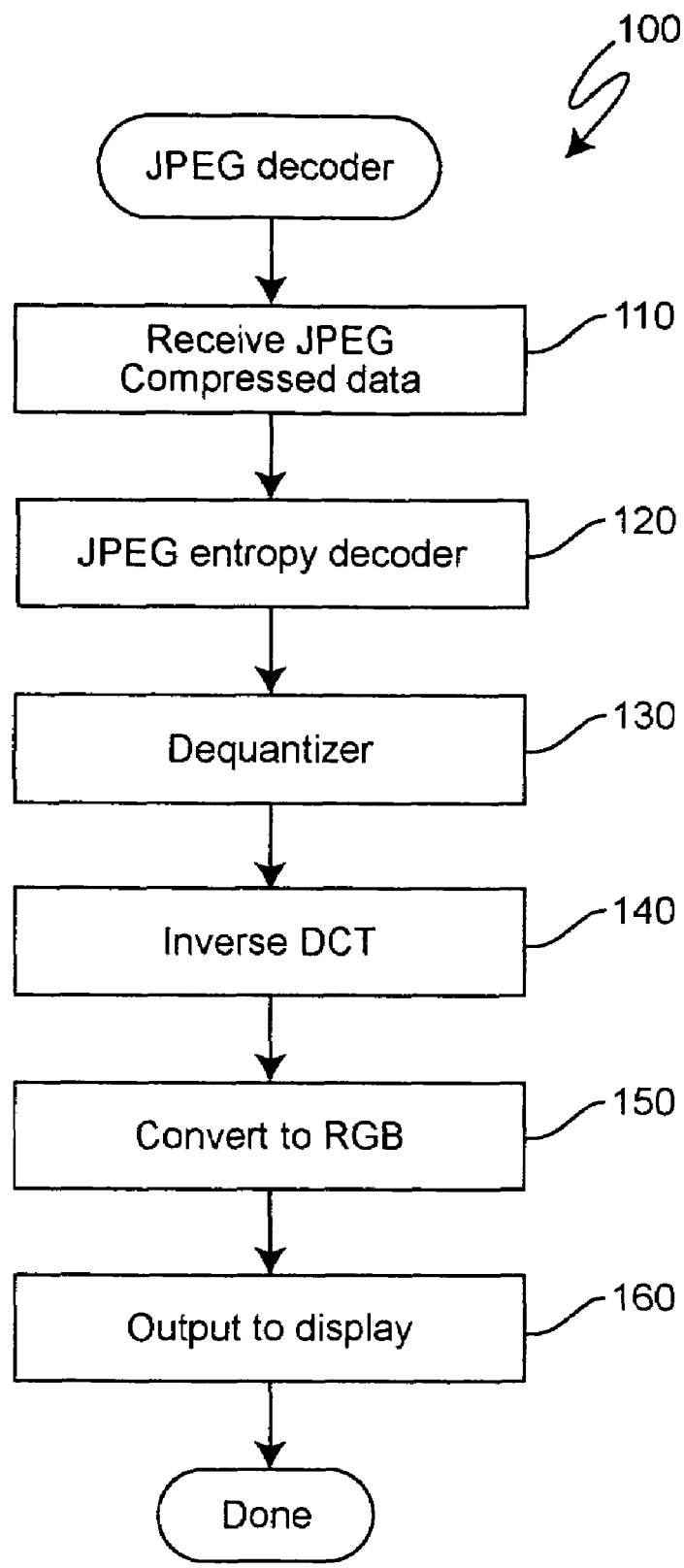
FIG. 1 is a block diagram of a generalized and simplified JPEG decoder.
Figure 2:
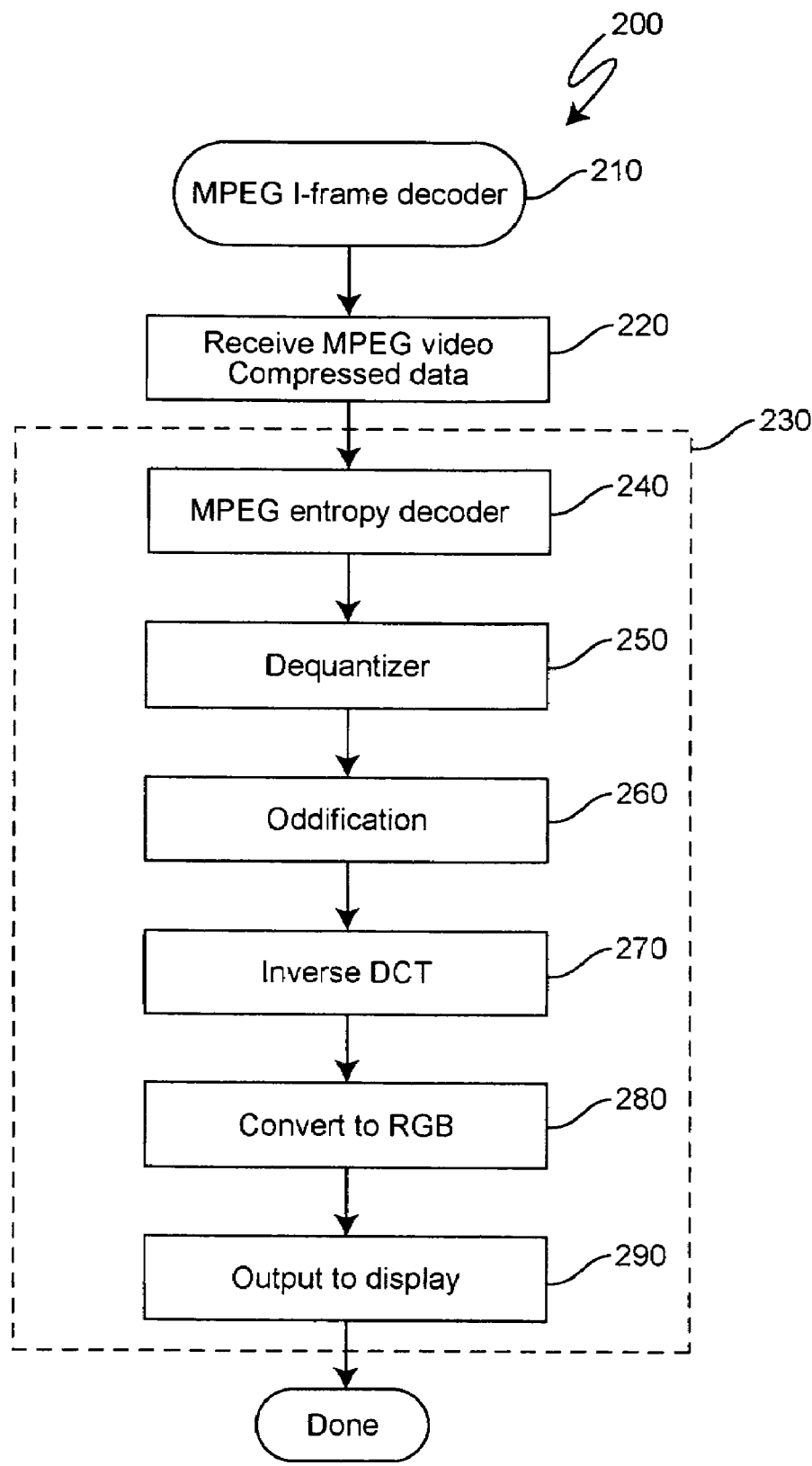
FIG. 2 is a block diagram of a generalized and simplified MPEG I-frame decoder.

Referring now to the drawings, and more particularly to FIG. 1, there is shown a block diagram of a generalized and simplified JPEG decoder 100. FIG. 2 shows a similar depiction of a generalized and simplified MPEG I-frame decoder 200, for comparison. It should be understood that the depictions of FIGS. 1 and 2 are arranged to convey an understanding of the concepts of the invention and that no portion of either Figure is admitted to be prior art in regard to the present invention, particularly since the simplifications of the JPEG and MPEG decoders depicted reflect the nature of the invention even though features of the invention are not included. While it is considered preferable by the inventors to implement the invention using the IBM PowerPC 401 processors embedded in some commercially available MPEG chips, the invention and its underlying principles are, in fact, generalized and can be implemented with most commercially available MPEG chips.

It should also be understood that while the invention will be discussed below in connection with the JPEG and MPEG standards, other standards exist and will be developed or at least proposed in the future to which the invention is similarly applicable, as will be understood by those skilled in the art since sufficient similarities will necessarily exist between standards sufficient for application of the invention in order to support comparable performance to the JPEG and MPEG standards.

The JPEG decoder 100 of FIG. 1 is basically of a pipeline architecture such that processes are performed in sequence on sequential groups of data. The JPEG compressed data stream is received at 110 and contains markers that identify and delineate the extent of the quantization tables and Huffman tables within the compressed data stream. The quantization tables are used by the dequantizer 130 and the Huffman tables are used by the entropy decoder 120. (Entropy coding exploits the fact that the most common values represent a high degree of order and thus contain the least information and should be coded with the smallest number of bits while relatively rare values represent comparatively more information and can be encoded with greater numbers of bits consistent with coding efficiency. More detailed discussions can be found in standard texts such as those incorporated by reference above.)

Once this data is in place, data corresponding to encoded macroblocks of the image are received, decoded and dequantized. Then, using the resulting values, an inverse orthogonal transform 140, usually an inverse discrete cosine transform (IDCT), is performed to regenerate image value data which corresponds to the image data which was previously compressed to JPEG format. This image data is then converted 150 to an RGB format or other format usable by a display 160 used to output the image to a viewer.

The simplified and generalized MPEG I-frame decoder 200 of FIG. 2 differs in significant ways from the JPEG decoder of FIG. 1. As is known in the art, under the MPEG standard, different types of decoding are performed on different types of images which are encoded and transmitted in different ways. I-frame images are independent of other frames and are transmitted in a form that reflects the entire image while other types of images, referred to as P-frames which are approximated or predicted from preceding I-frames or P-frames, generally based on detected motion, and B-frames, which are bi-directionally interpolated from preceding and following I-frames and/or P-frames. Since there is generally no temporal relationship between images in collections of images to be browsed, such as in image libraries alluded to above, it is assumed that compressed data received will be appropriate to an I-frame decoder 210 which would normally separate I-frame compressed data from P-frame and B-frame compressed data. This I-frame compressed data is then received (as depicted at 220) and passed to an MPEG decoder 230.

Similarly to the entropy decoder 120 of JPEG decoder 100, the data is first entropy decoded at 240 and dequantized at 250. However, the MPEG standard now calls for oddification 260 which, as alluded to above, necessarily results in loss of image fidelity if JPEG to MPEG transcoding is performed. Oddification is a process which adds error to the data to make round-off in all MPEG processes to occur in a consistent manner. Therefore, oddification inherently causes some loss of fidelity and, further, causes accumulation of error which may become substantial and significantly apparent. MPEG-1 and MPEG-2 standards call for different oddification techniques. So some MPEG chips allow oddification to be optional as well as a selected one of those two oddification methods. Then, as in the JPEG decoder of FIG. 1, an inverse discrete cosine transform (IDCT) is performed at 270, conversion to RGB or other standard is performed at 280 and the resulting data is output to a display as indicated at 290. As is well-understood in the art, the MPEG standard and MPEG chips embodying it are strongly adapted for video display of a rapid succession of images and assumes a high degree of correlation between successive images for efficiency. These capabilities are, of course, of no significant utility in regard to still image data such as would be applied to a printer, particularly if uncorrelated, as generally would be the case. However, it has been recognized by the inventors that the reconstructed image data is accessible and could be applied to either a display or a printer of other image processing devices.

Elements/processes 240-290 are usually provided by circuitry integrated on a single chip as indicated by dashed line 230. Thus, it should be appreciated that the oddification process is essentially hard-wired into the integrated circuit of the MPEG chip. However, commercially available MPEG chips do not generally have a port or other structure which provides access to the IDCT portion of the chip 270 such that JPEG compressed data can be decoded to image data using the high speed special purpose processors which are included in MPEG chips and allowing the oddification process to by bypassed, as shown in FIG. 3C.

Figure 3A:
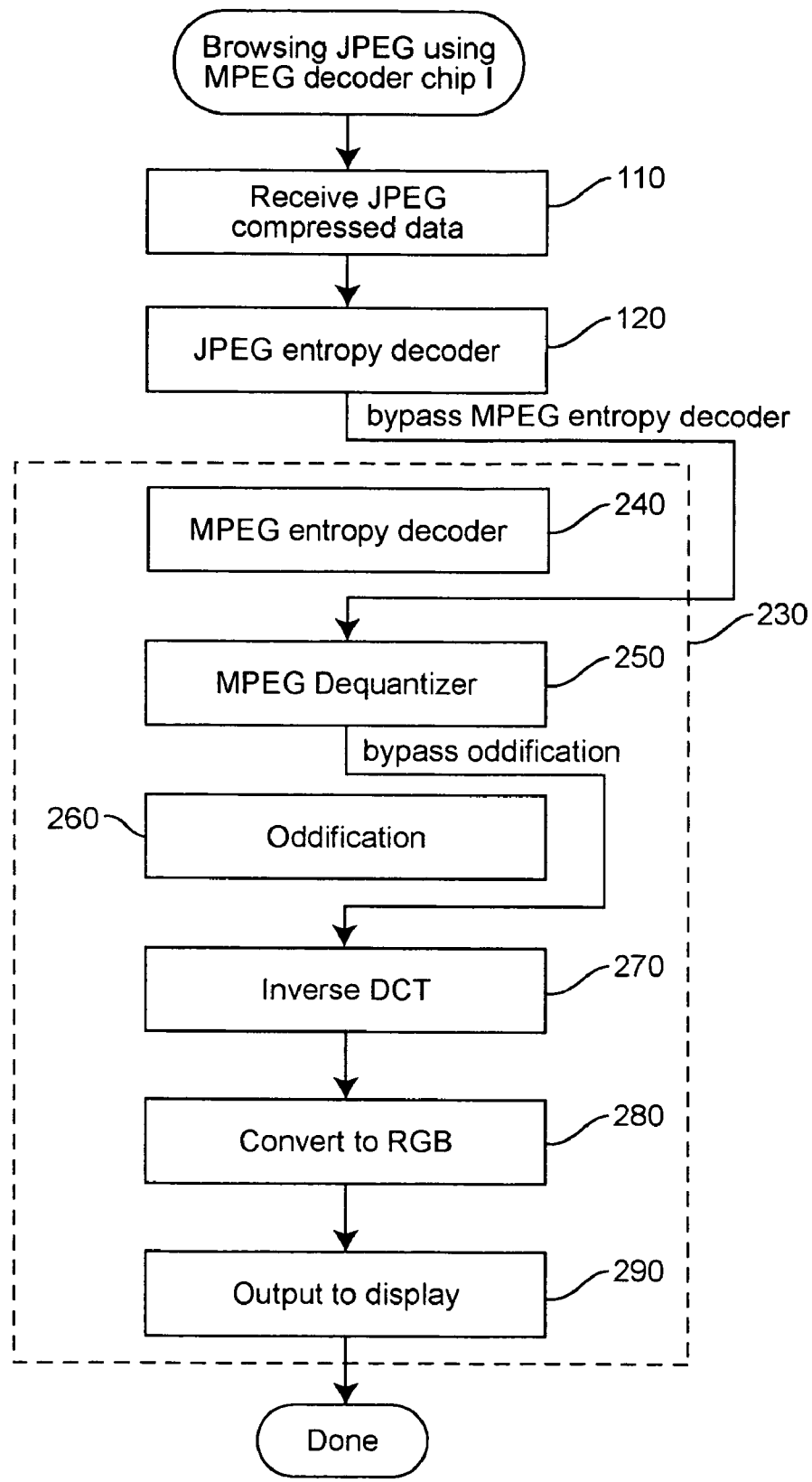
FIGS. 3A, 3B, 3C and 3D are block diagrams of browsing JPEG in a MPEG decoder chip in accordance with respective applications and embodiments of the invention.
Figure 3B:
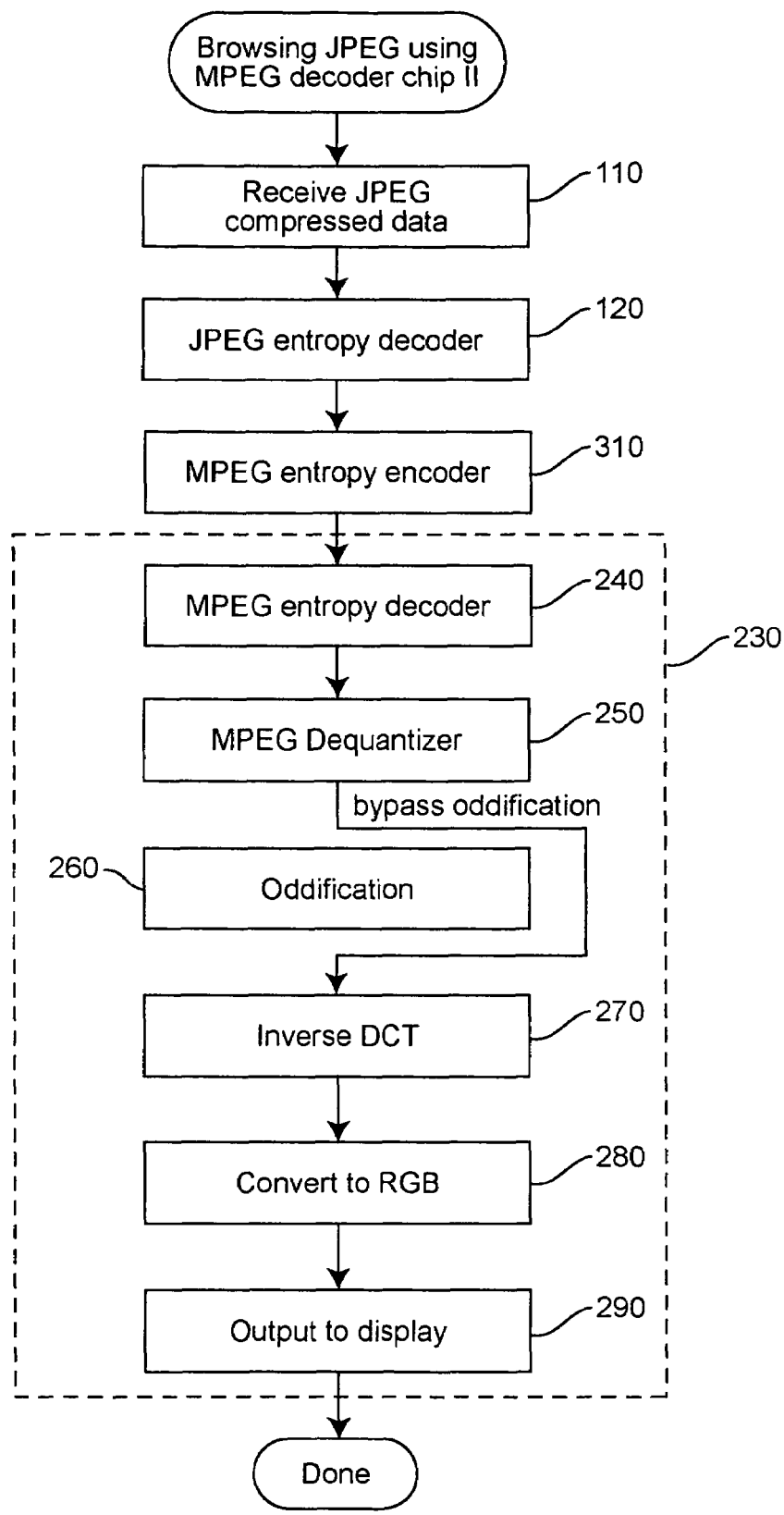
Figure 3C:
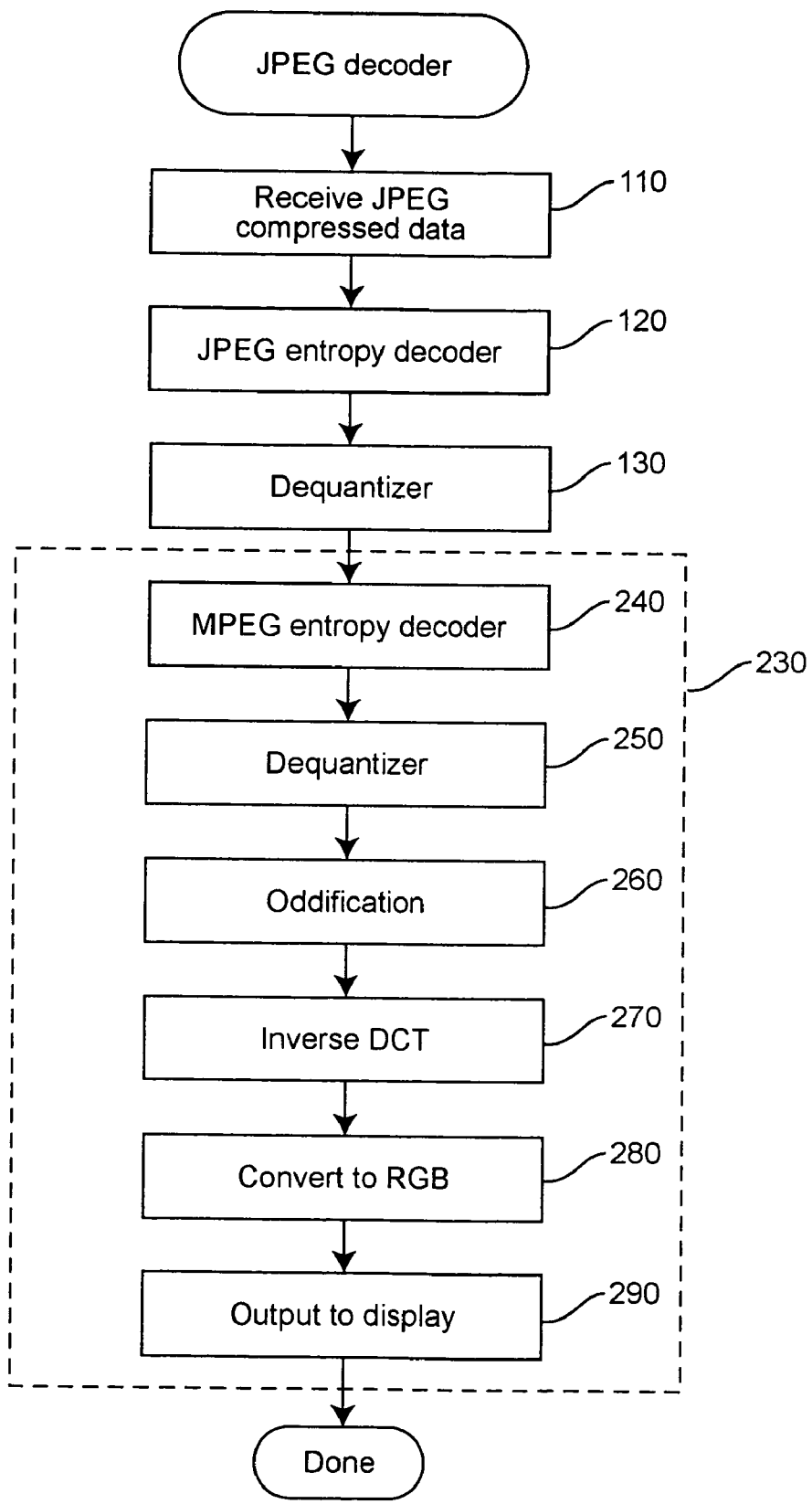
Figure 3D:
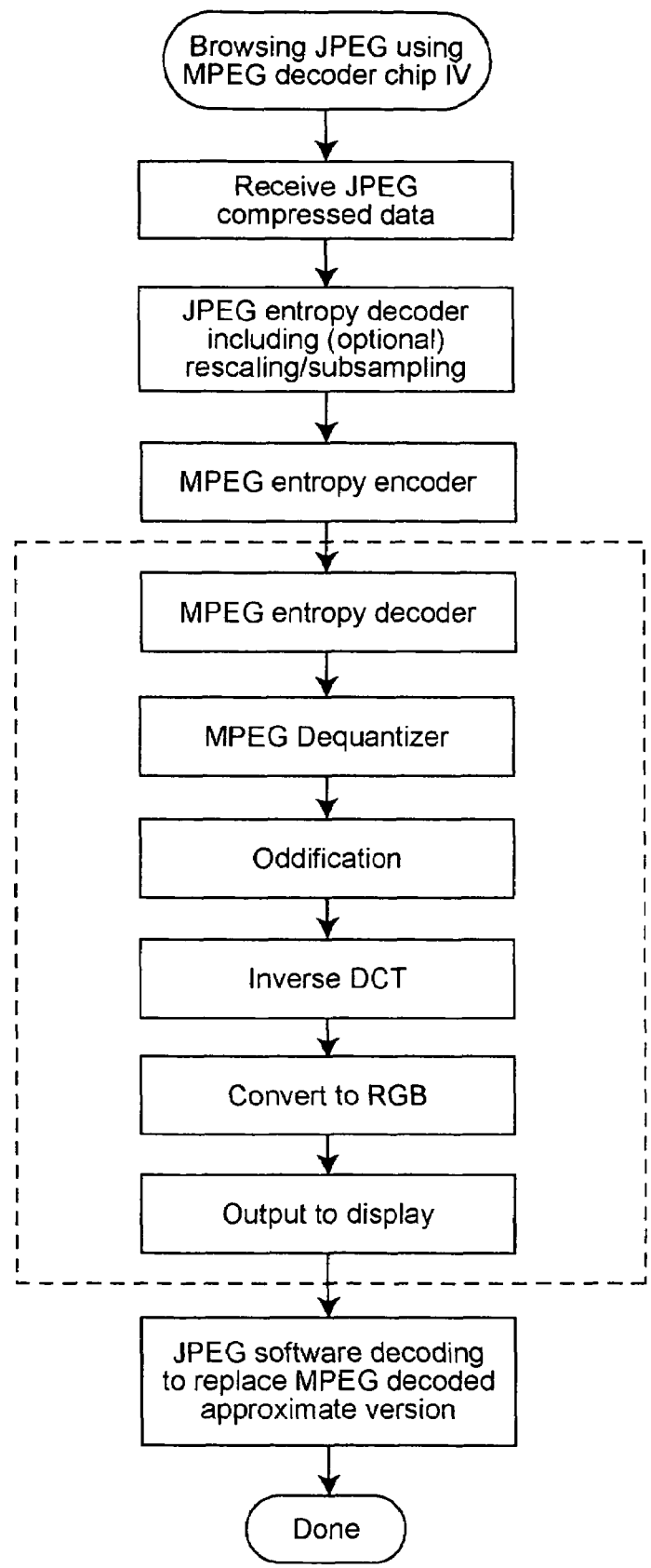

This basic incompatibility can be better appreciated from FIGS. 3A and 3B illustrating two basic embodiments of the invention. Both of these Figures will be recognized as a combination of FIGS. 1 and 2; including the processes of receiving JPEG data 110 and JPEG entropy decoding 120 prior to decoding with an MPEG decoder 230 with the oddification process bypassed in both embodiments. The embodiment of FIG. 3A also requires bypassing of the MPEG entropy decoder 240 while the embodiment of FIG. 3B performs MPEG entropy encoding 310 followed by MPEG entropy decoding 240 in the MPEG decoder 230. That is, in the embodiment of FIG. 3A, the JPEG quantization values are used directly by the MPEG dequantizer 250 including the actual DC quantization value instead of the MPEG DC quantization by powers of two. In the embodiment of FIG. 3B, the quantized DCT coefficients are re-encoded using an MPEG Huffman table to be compatible with the MPEG entropy decoder 240. The MPEG entropy decoder 240 can then pass the quantized DCT coefficients to the MPEG dequantizer 250. In either case, the Figures show bypassing the oddification process by disenabling it. However, there may be no hardware provision in commercially available MPEG decoders 230 for bypassing the oddification process 260 although some commercially available MPEG chips (e.g. those produced by the assignee of the present invention) allow oddification to be disabled. If oddification cannot be bypassed, it is generally desirable to replace the lower quality image it causes within a short time (e.g. ten seconds or less) before the lower quality is readily observed. It is known that the eye is distracted by motion and does not notice detail until an image is stable for a while. The replacement process is of relatively low visibility in such circumstances even if sequential and allows the appearance of presentation of high quality images to be maintained consistent with a potentially high image presentation rate in accordance with the invention.

Additional differences in hardware provided between standard MPEG decoders and generalized JPEG processing and data involve the number of tables and sub-sampling arrangements that can be accommodated and which are assumed in the initial coding of the JPEG data and hence constitute areas of incompatibility between JPEG data and MPEG hardware but which, as implemented in MPEG hardware, provide structure which, as the inventors have recognized, can be exploited in accordance with the invention for JPEG decoding.

For example, The MPEG-1 standard only allows two tables for luminance and two chrominance components, respectively, while the JPEG standard allows four tables. For speed, some MPEG chips, however, which accommodate the MPEG-2 standard, operate on two luminance blocks in parallel using two independent hardware tables and operate on the two chrominance components with two more tables. Thus three hardware tables may be provided in MPEG chips and four hardware tables are provided in some MPEG chips. On the other hand, while the JPEG standard specifies four tables, it is often the case that only two or three are used since the fourth image value component is needed only for printing (and would not be used for display, such as in browsing). The JPEG quantization tables found during parsing the JPEG data for Define Quantization Table (DQT) markers are loaded into the correct table positions. This can be done by creating the MPEG-2 syntax. However, since this syntax is interpreted in the embedded processor of the MPEG chip, it is possible to load the tables without creating the MPEG-2 syntax. Therefore, the maximum number of independent JPEG tables can be correctly handled by many MPEG chips and other MPEG chips are usually adequate for use in accordance with the invention since printing is not required in connection with browsing. Further, quantization is constant in JPEG and quantization scaling from each table for each macroblock as provided in MPEG need not be used.

In accordance with the invention, it is preferred to set the scale factor to 8 for all quantization tables at the image slice level. If the chip does not handle the number of quantization tables, then the JPEG quantized coefficients can be (optionally) rescaled to allow a better approximation using the MPEG quantization table limits.

Also, differences are presented by image data organization between JPEG and MPEG. MPEG always operates on four blocks (generally 8×8 pixels each, representing a macroblock of 16×16 pixels) of luminance data with one, two or four blocks of chrominance data while JPEG generally operates on four blocks of luminance data with one block each of Cr and Cb data although other options are provided as noted on pages 175-177 of the above incorporated Mitchell et al. text. In this case, MPEG and JPEG order are compatible. If not, (about 98% of JPEG images on the web are subsampled 2:1 on both axes and thus MPEG covers JPEG requirements but the data is in a different order), it is possible to decode a sufficient amount of JPEG data (e.g. two image block-rows) to re-encode a slice of MPEG luminance blocks. MPEG chips are commercially available with extended buffer memory capacity which are preferred for practice of the invention. In any case, suitable memory can be provided for the conversion. Further, instead of the JPEG run/size (RS) composite values as a basis for the Huffman coding of the AC coefficients, MPEG-1 and MPEG-2 have run/level symbols for the more common combinations of runs and levels. The less likely combinations in MPEG are encoded with separate fixed length codes whereas JPEG provides no such separate fixed length code but specifies all possible codings in a single table. JPEG ZRL codes (a run of more than fifteen zeros) must be merged with the next RS symbols' run in converting to MPEG.

Yet another point of incompatibility of MPEG hardware and JPEG data is that if the JPEG images have a 4:4:4 (equal luminance and chrominance dimensions), MPEG chrominance blocks are typically 2:1 subsampled in both coordinate directions. Currently available MPEG-1 chips and some MPEG-2 chips do not support color conversion and display of the 4:4:4 format that requires no sub-sampling in both axes.

In summary, these points of incompatibility prevent MPEG2 chips from being used to present JPEG encoded images in rapid succession in a manner suitable for browsing and other desirable presentations such as for image comparison (e.g. where the sequential or progressive JPEG presentations may compromise the image memory of a user or present an objectionable distraction. The invention, in its broadest concept, reorganizes JPEG data and available MPEG functions in a highly interdependent and counter-intuitive manner, preferably and advantageously using an intermediate code format of packed form, incorporated by reference and discussed below, to facilitate transcoding to MPEG coding to allow existing chips to rapidly process and present independent images in rapid sequence without significant loss of image fidelity.

The embedded processor is used to decode these blocks into packed intermediate format which will be described below. If the JPEG image is interleaved baseline data this processing will automatically entropy decode the related chrominance blocks into packed intermediate format. Otherwise, the JPEG compressed data is scanned for the chrominance start-of-scans markers and the related chrominance data separately entropy decoded into compressed intermediate format. In other words, MPEG requires luminance and chrominance to be interleaved in macroblocks and does not allow separate compression of luminance and chrominance.

The packed intermediate format is symbolically illustrated it FIG. 4 and is explained in detail in U.S. patent application Ser. No. 09/736,444, filed Dec. 15, 2003, assigned to the assignee of the present invention, which is hereby fully incorporated by reference. As shown in FIG. 4, in the preferred enhanced packed intermediate format, N (a byte) is the (even) number of shorts (byte pairs) in the DCT block; FZKlast is the flag bits F (=1 if any S>8), Z (=1 if ZRL is present) and Klast, the six bit index of the last non-zero coefficient in zig-zag scan order; DC (two bytes) is the DC coefficient with the level shift included; [ ] indicates optional items in the block; ZRL is the zero run length symbol (0xF0) followed by another byte indicating 16, 32 or 48 zero coefficients; RS (a byte) is the JPEG Huffman symbol; E1 (a byte) is up to eight extra bits (left or right justified); E2 (a byte) is S−8 left justified extra bits if E1 is left justified and the eight least significant extra bits if E1 is right justified. EOB (0x00, a byte) is followed by one or three arbitrary bytes such that N is an even number. The technique of converting JPEG compressed data to this format is rapidly executed in a software efficient manner as discussed in detail in the above-incorporated U.S. Patent Application.

In this preferred packed intermediate format (a special case of the more generalized packed format of the above-incorporated application), the non-zero coefficients always fit into two or four bytes before entropy encoding or after entropy decoding. RS contains the four-bit run length of zero DCT coefficients and the four-bit size S which specifies how many extra bits are needed to determine the magnitude and sign of the coefficient. E1 contains up to eight extra bits. E2 is only needed if more than eight extra bits are used. For the case where ZRLs are present, for runs greater than fifteen zeros, the ZRLs are made to fit in two bytes rather than one, two or three bytes. The first byte is the ZRL symbol, 0xF0, (e.g. R=5, S=0, i.e. sixteen zeros) and the second byte is the run as a multiple of sixteen. The number of ZRL codes is in the high nibble of this second byte. The JPEG EOB symbol always terminates the valid data in the block and is followed by one or three bytes to make the packed block fall onto a word boundary. Ensuring that necessary data is always fit into pairs of bytes in this manner simplifies and accelerates processing, especially in software.

It should be recognized that the above described packed format or other data formats for partially decoded data suitable for use with the present invention are not necessarily MPEG compliant but only represent JPEG data which is placed in a form such that the data can thereafter be decoded by a MPEG chip with substantially the same efficiency and throughput as if the data were, in fact, MPEG compliant. It should also be recognized that the usage of storage space generally required for MPEG image data is sufficient for high-resolution JPEG image data albeit used and allocated, in accordance with the invention, somewhat differently than in MPEG processing. The conversion to a format acceptable by the chip is assisted by an embedded processor that has access to internal hardware registers and busses.

It will be recognized by those skilled in the art in view of the above discussion, that the extra bits might convert to a sign bit using the MPEG convention of s=1 for negative and 0 for positive. The remaining bits could be positive. This can be achieved by testing the sign bit and, if "1" changing only that bit to a "0". Otherwise, all of the extra bits need to be inverted (e.g. by exclusive-OR operation).

In summary, the packed intermediate format provides for all information in JPEG encoded data to be represented in a compact form which has been found to provide numerous advantages in enhancing decoding and other processing that has been found useful such as altering the dynamic range of the image data.

If the number of JPEG quantization tables exceeds the MPEG chip hardware capability or the MPEG DC quantization is limited to MPEG allowed values, then approximate conversion to the MPEG quantization can easily be accomplished during JPEG entropy decoding into this packed format or as an independent process on the packed block row(s). Since JPEG allows enough tables for each component to have its own quantization table and MPEG-1 expects only one chrominance quantization table, one or all of the components may need to be rescaled. Only the non-zero transform coefficients need to be converted. The MPEG coefficients will be the rounded values of the transform coefficients scaled by the ratio of the JPEG quantization to the MPEG quantization for each color and position k in the zigzag scan order. The MPEG quantization values can be chosen to be powers of 2 to make the resealing faster. Alternately, the resealing results can be stored in a look up table(s) indexed by the JPEG quantized coefficient. In some cases, the quantization may be close enough that the distortions are acceptable during browsing. However, then the replacement with the correctly decoded in software JPEG reconstructed image will show a significant color/intensity shift. This choice can be left to the person browsing the images as to whether they prefer speed or better initial fidelity.

Figure 5:
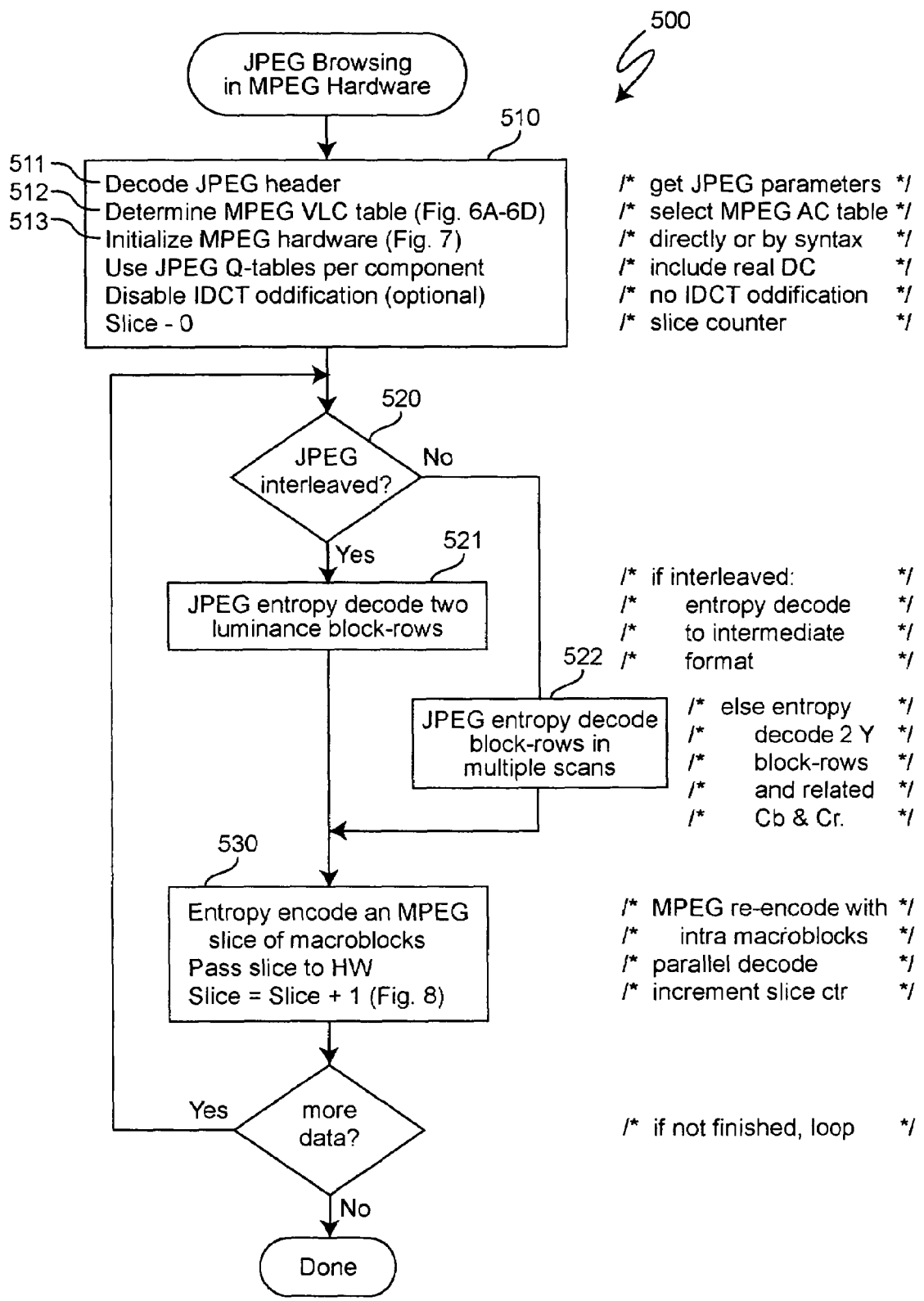
FIG. 5 is a high-level flow diagram of a preferred form of the transcoding process in accordance with the invention.

FIG. 5 is a high level block diagram of the steps which allow JPEG compressed images to be browsed using MPEG hardware by transcoding to an MPEG-2 slice in parallel with the software transcoding. This parallel processing allows the MPEG chips to more than double the throughput of JPEG browsing by operating substantially autonomously from the software processor. Foreseeable processor and JPEG entropy decoder improvements (depending on the amount of cache provided) may allow a four fold to ten fold increase in throughput since some MPEG processing is avoided in the processing of JPEG data in accordance with the invention. That is, with future foreseeable processor speeds, the software partial decoding of JPEG becomes less of a limitation on overall throughput while substantial processing overhead is shifted to and accelerated by hardware MPEG chips providing a substantial speed advantage over software processing.

In FIG. 5, the process steps illustrated each contain a plurality of processes briefly summarized by comments adjacent to the indicated process; some of which may be accomplished in alternative ways which will be discussed in detail in connection with subsequent Figures. Step 510 begins with decoding of the JPEG header 511 which is described in detail in Chapter 7 of the above-incorporated Pennebaker et al. text and Annex B of the JPEG standard. Decoding of the JPEG header provides the JPEG parameters for the image. This is followed by determination 512 of the variable length code (VLC) tables to use in the browsing process. MPEG-1 only has one VLC table (table 0), while MPEG-2 provides an additional table (table 1). No other VLC tables are provided or allowed. The VLC tables are generally hard-wired into MPEG chips and the optimal table to be chosen is the table containing codes which are closer to the data of the image. Several strategies will be discussed below in connection with FIGS. 6A-6D. These tables combined into a single table for comparison are provided in table 10.26 in the above-incorporated Mitchell et al. text but are duplicated here as Table I for convenience. (Roman Numerals will be used to reference tables in this description in order to avoid confusion with nomenclature for the VLC/Huffman tables therein, denoted by Arabic numerals.)

TABLE I

MPEG-2 VLC Tables
DCT AC coefficient table

| run/level | VLC table 0 | VLC table 1 |
|---|---|---|
| 0/1 | 1s (first) | 10s |
| 0/1 | 11s (next) | 10s |
| 0/2 | 0100 s | 110s |
| 0/3 | 0010 1s | 0111 s |
| 0/4 | 0000 110s | 1110 0s |
| 0/5 | 0010 0110 s | 1110 1s |
| 0/6 | 0010 0001 s | 0001 01s |
| 0/7 | 0000 0010 10s | 0001 00s |
| 0/8 | 0000 0001 1101 s | 1111 011s |
| 0/9 | 0000 0001 1000 s | 1111 100s |
| 0/10 | 0000 0001 0011 s | 0010 0011 s |
| 0/11 | 0000 0001 0000 s | 0010 0010 s |
| 0/12 | 0000 0000 1101 0s | 1111 1010 s |
| 0/13 | 0000 0000 1100 1s | 1111 1011 s |
| 0/14 | 0000 0000 1100 0s | 1111 1110 s |
| 0/15 | 0000 0000 1011 1s | 1111 1111 s |
| 0/16 | 0000 0000 0111 11s | 0000 0000 0111 11s |
| 0/17 | 0000 0000 0111 10s | 0000 0000 0111 10s |
| 0/18 | 0000 0000 0111 01s | 0000 0000 0111 01s |
| 0/19 | 0000 0000 0111 00s | 0000 0000 0111 00s |
| 0/20 | 0000 0000 0110 11s | 0000 0000 0110 11s |
| 0/21 | 0000 0000 0110 10s | 0000 0000 0110 10s |
| 0/22 | 0000 0000 0110 01s | 0000 0000 0110 01s |
| 0/23 | 0000 0000 0110 00s | 0000 0000 0110 00s |
| 0/24 | 0000 0000 0101 11s | 0000 0000 0101 11s |
| 0/25 | 0000 0000 0101 10s | 0000 0000 0101 10s |
| 0/26 | 0000 0000 0101 01s | 0000 0000 0101 01s |
| 0/27 | 0000 0000 0101 00s | 0000 0000 0101 00s |
| 0/28 | 0000 0000 0100 11s | 0000 0000 0100 11s |
| 0/29 | 0000 0000 0100 10s | 0000 0000 0100 10s |
| 0/30 | 0000 0000 0100 01s | 0000 0000 0100 01s |
| 0/31 | 0000 0000 0100 00s | 0000 0000 0100 00s |
| 0/32 | 0000 0000 0011 000s | 0000 0000 0011 000s |
| 0/33 | 0000 0000 0010 111s | 0000 0000 0010 111s |
| 0/34 | 0000 0000 0010 110s | 0000 0000 0010 110s |
| 0/35 | 0000 0000 0010 101s | 0000 0000 0010 101s |
| 0/36 | 0000 0000 0010 100s | 0000 0000 0010 100s |
| 0/37 | 0000 0000 0010 011s | 0000 0000 0010 011s |
| 0/38 | 0000 0000 0010 010s | 0000 0000 0010 010s |
| 0/39 | 0000 0000 0010 001s | 0000 0000 0010 001s |
| 0/40 | 0000 0000 0010 000s | 0000 0000 0010 000s |
| 1/1 | 011s | 010s |
| 1/2 | 0001 10s | 0011 0s |
| 1/3 | 0010 0101 s | 1111 001s |
| 1/4 | 0000 0011 00s | 0010 0111 s |
| 1/5 | 0000 0001 1011 s | 0010 0000 s |
| 1/6 | 0000 0000 1011 0s | 0000 0000 1011 0s |
| 1/7 | 0000 0000 1010 1s | 0000 0000 1010 1s |
| 1/8 | 0000 0000 0011 111s | 0000 0000 0011 111s |
| 1/9 | 0000 0000 0011 110s | 0000 0000 0011 110s |
| 1/10 | 0000 0000 0011 101s | 0000 0000 0011 101s |
| 1/11 | 0000 0000 0011 100s | 0000 0000 0011 100s |
| 1/12 | 0000 0000 0011 011s | 0000 0000 0011 011s |
| 1/13 | 0000 0000 0011 010s | 0000 0000 0011 010s |
| 1/14 | 0000 0000 0011 001s | 0000 0000 0011 001s |
| 1/15 | 0000 0000 0001 0011 s | 0000 0000 0001 0011 s |
| 1/16 | 0000 0000 0001 0010 s | 0000 0000 0001 0010 s |
| 1/17 | 0000 0000 0001 0001 s | 0000 0000 0001 0001 s |
| 1/18 | 0000 0000 0001 0000 s | 0000 0000 0001 0000 s |
| 2/1 | 0101 s | 0010 1s |
| 2/2 | 0000 100s | 0000 111s |
| 2/3 | 0000 0010 11s | 1111 1100 s |
| 2/4 | 0000 0001 0100 s | 0000 0011 00s |
| 2/5 | 0000 0000 1010 0s | 0000 0000 1010 0s |
| 3/1 | 0011 1s | 0011 1s |
| 3/2 | 0010 0100 s | 0010 0110 s |
| 3/3 | 0000 0001 1100 s | 0000 0001 1100 s |
| 3/4 | 0000 0000 1001 1s | 0000 0000 1001 1s |
| 4/1 | 0011 0s | 0001 10s |
| 4/2 | 0000 0011 11s | 1111 1101 s |
| 4/3 | 0000 0001 0010 s | 0000 0001 0010 s |
| 5/1 | 0001 11s | 0001 11s |
| 5/2 | 0000 0010 01s | 0000 0010 0s |
| 5/3 | 0000 0000 1001 0s | 0000 0000 1001 0s |
| 6/1 | 0001 01s | 0000 110s |
| 6/2 | 0000 0001 1110 s | 0000 0001 1110 s |
| 6/3 | 0000 0000 0001 0100 s | 0000 0000 0001 0100 s |
| 7/1 | 0001 00s | 0000 100s |
| 7/2 | 0000 0001 0101 s | 0000 0001 0101 s |
| 8/1 | 0000 111s | 0000 101s |
| 8/2 | 0000 0001 0001 s | 0000 0001 0001 s |
| 9/1 | 0000 101s | 1111 000s |
| 9/2 | 0000 0000 1000 1s | 0000 0000 1000 1s |
| 10/1 | 0010 0111 s | 1111 010s |
| 10/2 | 0000 0000 1000 0s | 0000 0000 1000 0s |
| 11/1 | 0010 0011 s | 0010 0001 s |
| 11/2 | 0000 0000 0001 1010 s | 0000 0000 0001 1010 s |
| 12/1 | 0010 0010 s | 0010 0101 s |
| 12/2 | 0000 0000 0001 1001 s | 0000 0000 0001 1001 s |
| 13/1 | 0010 0000 s | 0010 0100 s |
| 13/2 | 0000 0000 0001 1000 s | 0000 0000 0001 1000 s |
| 14/1 | 0000 0011 10s | 0000 0010 1s |
| 14/2 | 0000 0000 0001 0111 s | 0000 0000 0001 0111 s |
| 15/1 | 0000 0011 01s | 0000 0011 1s |
| 15/2 | 0000 0000 0001 0110 s | 0000 0000 0001 0110 s |
| 16/1 | 0000 0001 00s | 0000 0011 01s |
| 16/2 | 0000 0000 0001 0101 s | 0000 0000 0001 0101 s |
| 17/1 | 0000 0001 1111 s | 0000 0001 1111 s |
| 18/1 | 0000 0001 1010 s | 0000 0001 1010 s |
| 19/1 | 0000 0001 1001 s | 0000 0001 1001 s |
| 20/1 | 0000 0001 0111 s | 0000 0001 0111 s |
| 21/1 | 0000 0001 0110 s | 0000 0001 0110 s |
| 22/1 | 0000 0000 1111 1s | 0000 0000 1111 1s |
| 23/1 | 0000 0000 1111 0s | 0000 0000 1111 0s |
| 24/1 | 0000 0000 1110 1s | 0000 0000 1110 1s |
| 25/1 | 0000 0000 1110 0s | 0000 0000 1110 0s |
| 26/1 | 0000 0000 1101 1s | 0000 0000 1101 1s |
| 27/1 | 0000 0000 0001 1111 s | 0000 0000 0001 1111 s |
| 28/1 | 0000 0000 0001 1110 s | 0000 0000 0001 1110 s |
| 29/1 | 0000 0000 0001 1101 s | 0000 0000 0001 1101 s |
| 30/1 | 0000 0000 0001 1100 s | 0000 0000 0001 1100 s |
| 31/1 | 0000 0000 0001 1011 s | 0000 0000 0001 1011 s |
| EOB | 10 | 0110 |
| Escape | 0000 01 | 0000 01 |

(s = sign bit)

In the above table, the first column gives the run of zero AC coefficients followed by the magnitude (level) of the non-zero coefficient. The second and third columns list the AC coefficient variable length code (VLC) words for table 0 and table 1, respectively. The sign bit is "0" for positive and "1" for negative (opposite to the convention for JPEG). The duplicate entry for run/level of 0/1 in table 0 only applies to predicted images and does not need to be considered further. Intra-coded images (e.g. independent I-images in MPEG terminology which do not utilize data from preceding or following images) always use the "11s" code. The escape code is used as a prefix before sending the actual run in six bits and the level in twelve bits if the run/level combination is not in the table.

It should be noted that more than half the code words are identical between table 0 and table 1 and only a few have different numbers of bits which are listed in the following Table II.

TABLE II

| JPEG R/S | run/level | VLC table 0 | VLC table 1 | diff. (bits) |
|---|---|---|---|---|
| 0x00 | EOB | 10 | 0110 | −2 |
| 0x02 | 0/2 | 0100s | 110s | +1 |
| 0x02 | 0/3 | 00101s | 0111s | +1 |
| 0x03 | 0/4 | 0000110s | 11100s | +2 |
| 0x03 | 0/5 | 00100110s | 11101s | +3 |
| 0x03 | 0/6 | 00100001s | 000101s | +2 |
| 0x03 | 0/7 | 0000001010s | 000100s | +4 |
| 0x04 | 0/8 | 000000011101s | 1111011s | +5 |
| 0x04 | 0/9 | 000000011000s | 1111100s | +5 |
| 0x04 | 0/10 | 000000010011s | 00100011s | +4 |
| 0x04 | 0/11 | 000000010000s | 00100010s | +4 |
| 0x04 | 0/12 | 0000000011010s | 11111010s | +5 |
| 0x04 | 0/13 | 0000000011001s | 11111011s | +5 |
| 0x04 | 0/14 | 0000000011000s | 11111110s | +5 |
| 0x04 | 0/15 | 0000000010111s | 11111111s | +5 |
| 0x12 | 1/2 | 000110s | 00110s | +1 |
| 0x12 | 1/3 | 00100101s | 1111001s | +1 |
| 0x13 | 1/4 | 0000001100s | 00100111s | +2 |
| 0x13 | 1/5 | 000000011011s | 00100000s | 0 |
| 0x21 | 2/1 | 0101s | 00101s | −1 |
| 0x22 | 2/3 | 0000001011s | 11111100s | +2 |
| 0x23 | 2/4 | 000000010100s | 0000001100s | +2 |
| 0x41 | 4/1 | 00110s | 000110s | −1 |
| 0x42 | 4/2 | 0000001111s | 11111101s | +2 |
| 0x52 | 5/2 | 0000001001s | 000000100s | +1 |
| 0x61 | 6/1 | 000101s | 0000110s | −1 |
| 0x71 | 7/1 | 000100s | 0000100s | −1 |
| 0xA1 | 10/1 | 00100111s | 1111010s | +1 |
| 0xE1 | 14/1 | 0000001110s | 000000101s | +1 |
| 0xF1 | 15/1 | 0000001101s | 000000111s | +1 |

The first column is the JPEG RS symbol under which the MPEG level falls. The last column shows the difference in number of bits (table 0 number of bits minus table 1 number of bits). For S>1, each RS symbol covers multiple levels. Table II only shows the combinations that appear in the MPEG tables. The "s" bit (sign) doubles the number of entries represented in the table.

Figure 6A:
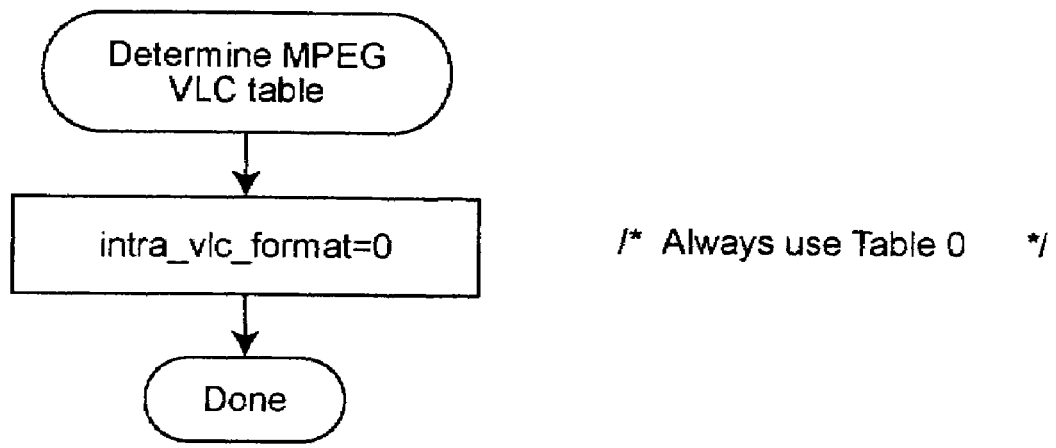
FIGS. 6A, 6B, 6C and 6D are flow diagrams of alternative techniques for determining the MPEG variable length code (VLC) table based on JPEG coded data including the define Huffman table (DHT) marker.
Figure 6B:
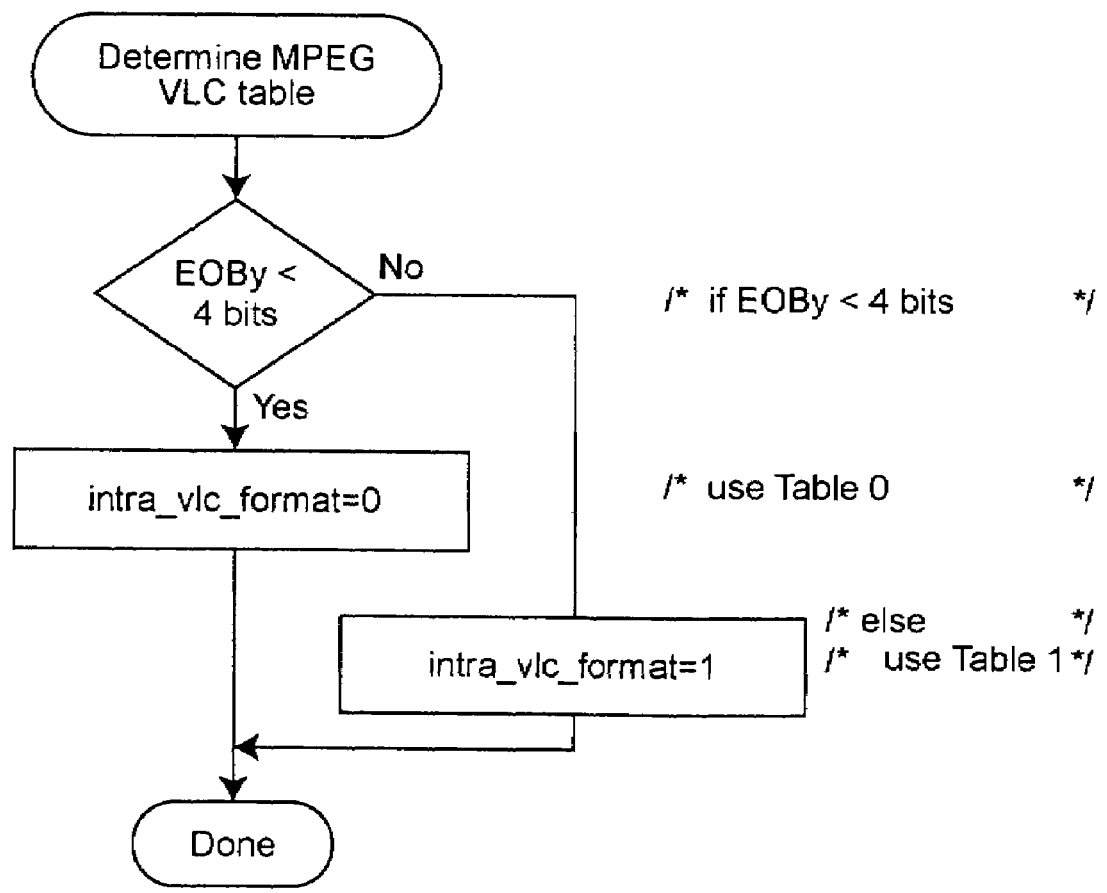
Figure 6C:
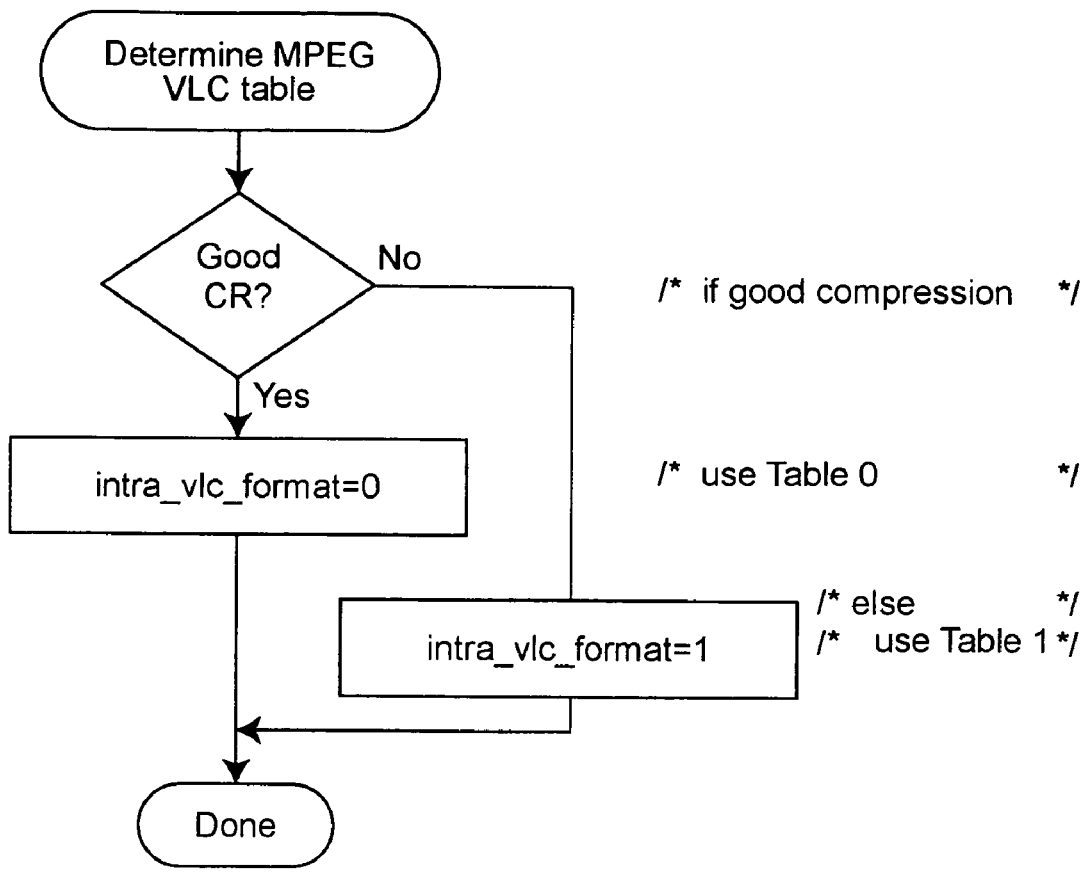
Figure 6D:

It is desirable to choose the VLC table to yield the lesser number of bits insofar as is possible for the JPEG compressed data of interest. The following alternative strategies for performing this choice will now be explained in connection with FIGS. 6A-6D. FIG. 6A shows the unconditional choice of table 0 which is the only choice provided in MPEG-1 chips. FIG. 6B illustrates the additional alternative of selecting table 1 on the basis of the JPEG luminance Huffman table using more than three bits for the EOB code. That is, if EOB codes are very frequent (e.g. about ¼ of the codes) to justify a two-bit code, VLC table 0 is probably optimal notwithstanding that other codes are thus forced to greater numbers of bits since the amount of image data is necessarily relatively small. Conversely, relatively infrequent EOB codes (e.g. about ¹⁄₁₆ of the codes) infers significantly more image data which can be expressed in fewer bits according to VLC Table 1. FIG. 6C illustrates basing the choice of table on whether or not the compression ratio is good in accordance with a rationale similar to that discussed in regard to FIG. 6B. FIG. 6D assumes a custom table and provides for its use by calculating the number of bits based on the Define Huffman Table (DHT) marker. The process of FIG. 6D will estimate accurately which table will produce less bits. Since most of the MPEG code words have the same lengths in table 0 and table 1, only those code words which have a differing number of bits need be considered in the calculation.

Table III gives a summary of the average difference in bits for each of the RS symbols. Only RS symbols with S<5 and runs of 15 or less need be considered. Scaling up the table entries by 4 will convert the floating point numbers to integers. In Table III a '.' represents zero difference of bits and indicates that the tables have the same coding efficiency. Otherwise, negative numbers favor VLC table 0 and positive numbers favor VLC table 1 for optimal transcoding efficiency (e.g. average over the symbols of that size and relative frequency of occurrence wherein all symbols of a given size are equally likely to appear.

TABLE III

Summary of the average difference (bits) for the levels corresponding to each RS symbol.

|   |   | S=0 | S=1 | S=2 | S=3 | S=4 |
|---|---|---|---|---|---|---|
| R | 0 | −2 | . | +1 | +3 | +4.75 |
|   | 1 | . | . | +1 | +1.5 | . |
|   | 2 | . | −1 | +1 | +0.5 | . |
|   | 3 | . | . | . | . | . |
|   | 4 | . | −1 | +2 | . | . |
|   | 5 | . | . | +0.5 | . | . |
|   | 6 | . | −1 | . | . | . |
|   | 7 | . | −1 | . | . | . |
|   | 8 | . | . | . | . | . |
|   | 9 | . | . | . | . | . |
|   | A | . | +1 | . | . | . |
|   | B | . | . | . | . | . |
|   | C | . | . | . | . | . |
|   | D | . | . | . | . | . |
|   | E | . | +1 | . | . | . |
|   | F | . | +1 | . | . | . |

A methodology for estimating the bits is given below where i indexes into the JPEG AC RS table for each given component (e.g. color=0, 1, 2 which are arbitrary numbers). This pseudo-code assumes a table difference "diff" containing the last four columns of Table III multiplied by 4. (Column S=0 contains only the EOB value and need not be further considered.)

```
sum = 0                        /* clear total bits           */
do color=0 to 2;               /* for Y, Cb, Cr              */
    bits = 0                   /* clear bits estimate        */
    num=0x10000                /* start with 2**17           */
    i=0                        /* start at first RS          */
    do j=1 to 16               /* loop for 16 lengths        */
        if L(j) > 0            /* if codes of L bits         */
            do k=1 to L(j)     /* loop for number in L       */
                tem=RS(i)      /* load next RS symbol        */
                i=i+1          /* increment index            */
                if tem=0       /* if EOB                     */
                    bits=bits−num<<3  /* EOB weighted by −8  */
```

```
                  else                    /* else not EOB           */
                    S=0x0F AND tem        /* isolate S              */
                    if S<5                /* if small S             */
                      S=S-1               /* range 1-4 in 2 bits    */
                      R=tem >> 4          /* isolate run            */
                      n=(R<<2)+S          /* calculate index        */
                      bits=bits+num*diff(n)  /* add number*diff     */
                    endif                 /* end if small S         */
                  endif                   /* end else not EOB       */
                enddo                     /* end k loop             */
              endif                       /* end if L(j) > 0        */
              num=num >> 1                /* cut number in half     */
          enddo                           /* end loop for 16        */
          sum= sum + H(color)*V(color)*bits   /*weight by blocks/*
end
``` where H and V are the number of relative number of blocks horizontally and vertically between the components in the JPEG image.

If the sum is negative, table 0 is selected. Otherwise table 1 is selected. When the JPEG image only has luminance, the loop is only done for luminance and (−8*0x10000>>1) is added to the sum. The chrominance blocks required by MPEG, but which may not exist for a given image, are recreated as 100% EOB symbols, but there are only half as many chrominance blocks as luminance blocks. A more sophisticated formula could weight the differences for smaller magnitudes more in calculating the average for each RS symbol.

Another alternate embodiment is practical if the JPEG compressed data has been previously transcoded or the calculation is done during the entropy decoding of the entire JPEG image into intermediate format. In this alternate embodiment the actual occurrence of RS symbols is used to compute which table would give the shortest MPEG compressed data.

Figure 7A:
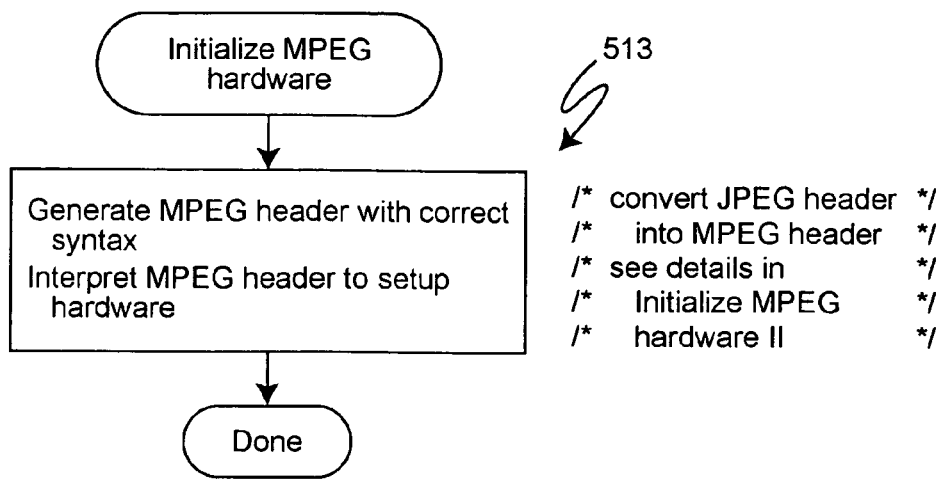
FIGS. 7A and 7B are flow diagrams of alternative techniques for Initializing MPEG chip hardware with and without creating an MPEG header, respectively.
Figure 7B:
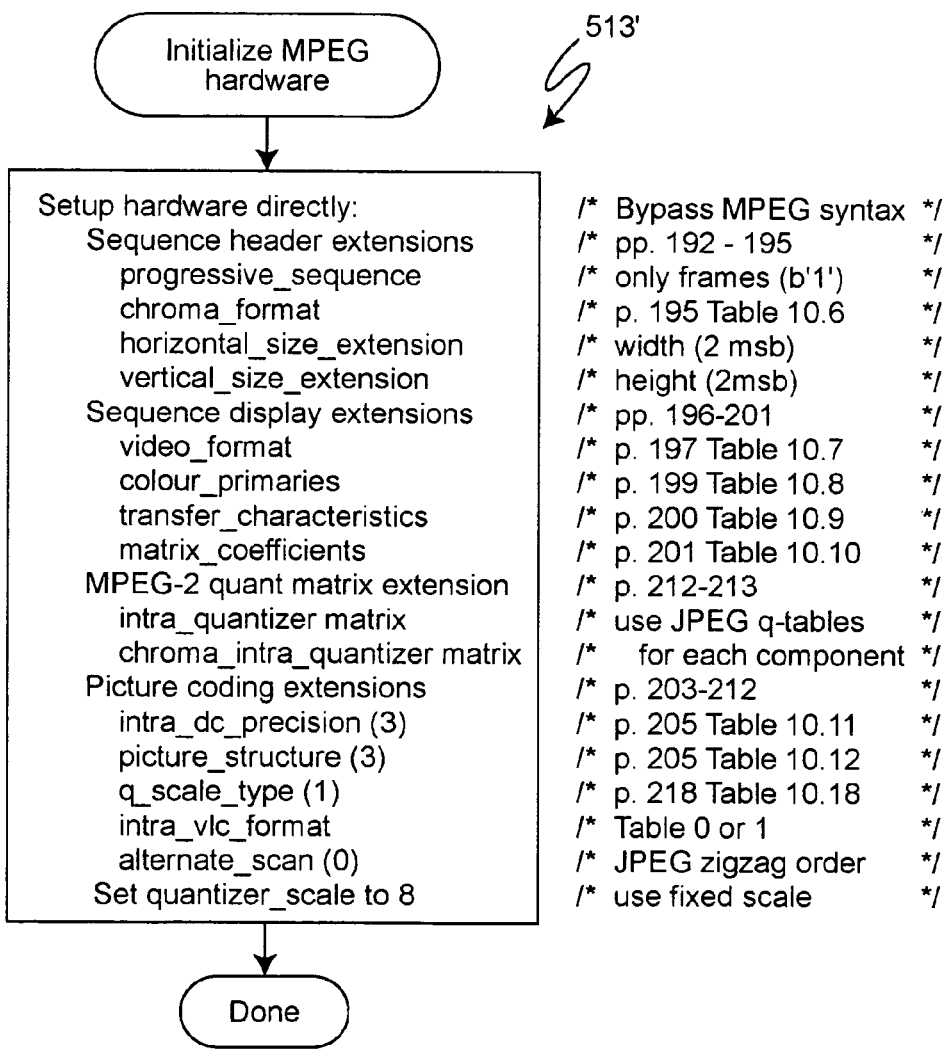

Referring again briefly to FIG. 5, having completed determination of the MPEG VLC table to be used, the next step is to initialize (513) the MPEG hardware, either directly or by syntax. Two alternative methods of doing so are illustrated in the flow charts of FIGS. 7A and 7B. The first (FIG. 7A) generates an MPEG header with correct syntax. The second (FIG. 7B, designated 513') directly sets the hardware. Because the partial software decompression (e.g. entropy decoding) may be done with knowledge of the target hardware decoder, advantage can be taken of special information about the target hardware such as not generating a true header but simply loading the appropriate variables into registers.

Returning now to FIG. 5, step 510 is completed by using the correct JPEG quantization table (Q-table) for each component (e.g. luminance and chrominance). MPEG-1 traditionally requires the DC quantization value to be identically 8. MPEG-2 allows the DC quantization to be 8, 4 or 2. If possible, the true DC quantization should be used. If not possible, then the required value of 8 will distort the image unless a correction of the DC values is made to compensate for this hardware inflexibility. The resealing is straightforward for the DC coefficient since the quantization for the MPEG DC is a power of two (e.g. 8, 4, 2). So the product of the JPEG DC quantization and the DC coefficient can be taken and then the result optionally rounded by adding half the MPEG quantization value before shifting right 3, 2, or 1. Alternately, a lookup table could precompute the rescaled quantized DC coefficients for each color component. Then, such correction is likely to lead to some distortion in the final decompressed image. If another image is not promptly decoded and substituted, the software can slowly substitute a properly decoded image from the original compressed data while the distortion in the data rapidly decoded in accordance with the invention may or may not be noticeable at the presentation rates possibly encountered during browsing. Preferably, if possible, the IDCT oddification may optionally be disabled to reconstruct an image closer to that which would be decoded by normal (JPEG) software decoding. In any case, the image as decoded by normal software decoding may be substituted if the image presentation rate allows. At faster browsing rates, the fidelity of the image presented will be of relatively less importance to a user. Finally, the slice counter is initialized to zero.

Having completed the setup of the MPEG-2 chip hardware 510, it is determined from the decoded JPEG header if the associated JPEG data is interleaved at 520 of FIG. 5. If the data is interleaved, two luminance block rows of the data are entropy decoded to an intermediate format, preferably the packed intermediate format as discussed above with reference to the above-incorporated patent application. In addition, the chrominance corresponding chrominance blocks must also be decoded to the packed intermediate format.

If the number of Chrominance blocks corresponding to the four luminance blocks of an MPEG macroblock exceeds the capacity of the hardware (e.g. only accepts MPEG-1 data which has one chrominance block of each color component per macroblock), fast techniques for converting multiple blocks into a single block in the transform domain are disclosed in U.S. Patent Application which is hereby fully incorporated by reference.

If the data is not interleaved, two luminance (2Y) block rows and associated chrominance (e.g. Cb and Cr) are entropy decoded. This provides image data which can be re-encoded as a MPEG slice of macroblocks and removes a significant compatibility issue between JPEG and MPEG discussed above. This MPEG entropy encoding can be performed rapidly because of the packed format. As above, the number of chrominance blocks per macroblock may need to be adjusted.

Under JPEG, the components can be sub-sampled over a range of 1 to 4, horizontally and/or vertically. If the chrominance image component is not subsampled vertically by 2:1, latency to collect data for an MPEG slice is increased compared with JPEG. An extra block-row of luminance data must be entropy decoded before the macroblock re-encoding can be initiated, and then re-encoding can be conducted concurrently with the decoding of the following block-row. This requires additional memory (which is available in commercial MPEG chips) but at most latency is a very small fraction of the image processing time since it corresponds, at most, to an MPEG slice.

Once the MPEG slice has been entropy encoded, the encoded slice data can be passed to the MPEG hardware chip and the current slice number incremented as shown at 530. The process then loops to 520 of FIG. 5 for decoding and re-encoding of the next slice in accordance with the MPEG data format.

An exemplary and preferred methodology for performing the processes summarized above in regard to step 530 of FIG. 5 will now be described in greater and increasing detail in FIGS. 8-18. It should be noted that FIG. 9 details a step 820 in FIG. 8, FIGS. 11-14A and 14B detail respective processes and alternatives 1020, 1041, 1043, 1044 and 1044' in FIG. 10, FIGS. 15A-15C are alternative processes to perform process 1430 of FIG. 14, FIG. 16 details process 1440 of FIG. 14, FIG. 17 details a process 1610 of FIG. 16 and FIG. 18 details a process 1731 of FIG. 17. These cross-references are noted in the respective Figures.

It should be noted that the processes as broken down for purposes of explanation in FIGS. 8-18 generally follow processes available in commercially available MPEG chips, as will be readily understood by those skilled in the art. Where particular strategies are preferred or may yield enhanced performance in available control of certain processes, these strategies will be described in detail. Otherwise, relatively brief description of these processes will be sufficient for those skilled in the art to successfully practice the invention. Page references in the drawings are to the above incorporated MPEG Video Compression Standard.

Figure 8:
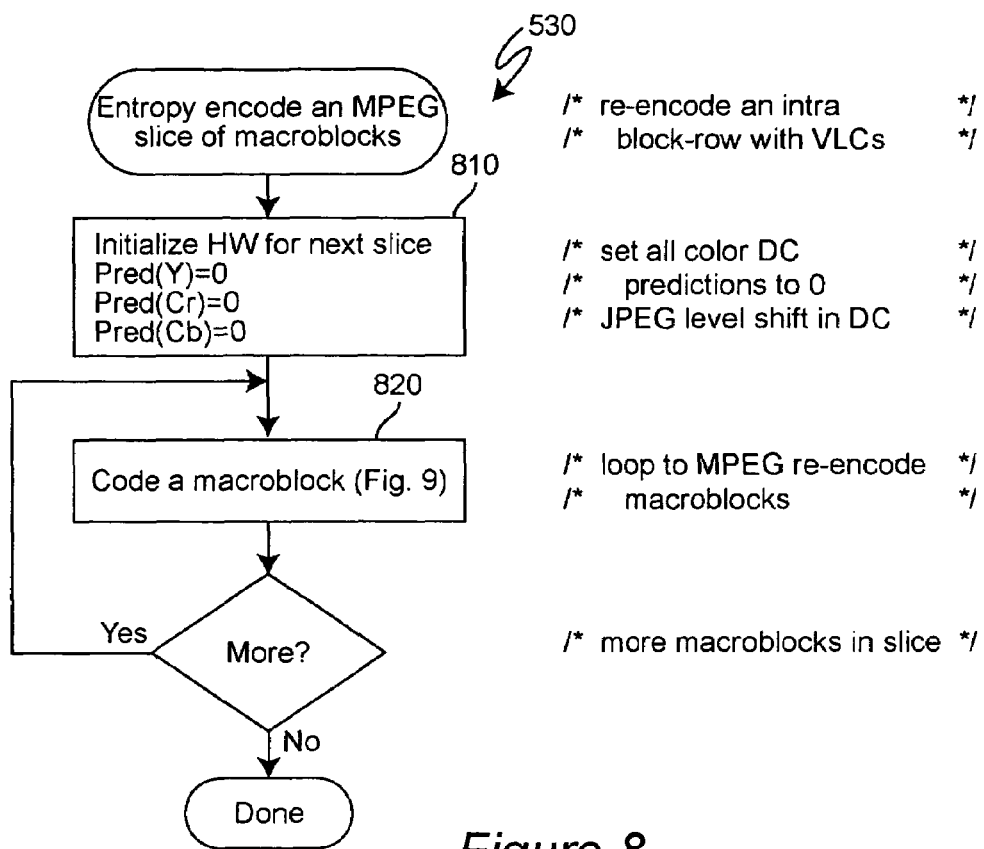
FIG. 8 is a flow diagram for entropy encoding of an MPEG slice of macroblocks shown in FIG. 5.

MPEG-2 requires a slice header to precede each macrolock row and care must be taken to follow this convention as required by the hardware. To entropy encode an MPEG slice of macroblocks, it is necessary to re-encode an interblock row with variable length codes (VLCs). Therefore, as shown in FIG. 8, step 810 initializes the MPEG2 chip hardware for the next slice by setting all the color DC predictions (Pred(Y), Pred(Cr), Pred(Cb)) to zero to correspond to the JPEG level shift of the DC coefficient. To answer a point of incompatibility between MPEG and JPEG noted above, the DC coefficient of the transform data must be appropriately compensated. Then, a macroblock may be re-encoded as indicated at 820, as detailed in FIG. 9, looping to re-encode all the macroblocks in a slice. The looping for each sequential macroblock in a slice also reformats the order of data to reconcile JPEG and MPEG formats.

Figure 9:
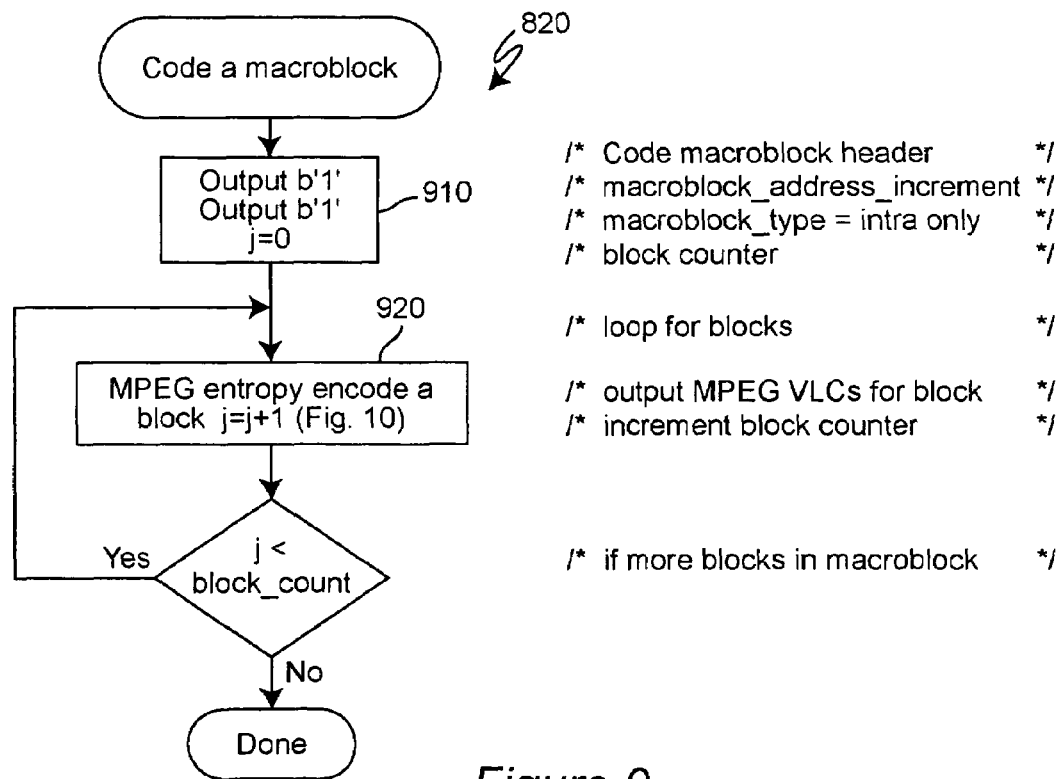
FIG. 9 is a more detailed flow diagram for the process of coding a macroblock included in FIG. 8.
Figure 10:
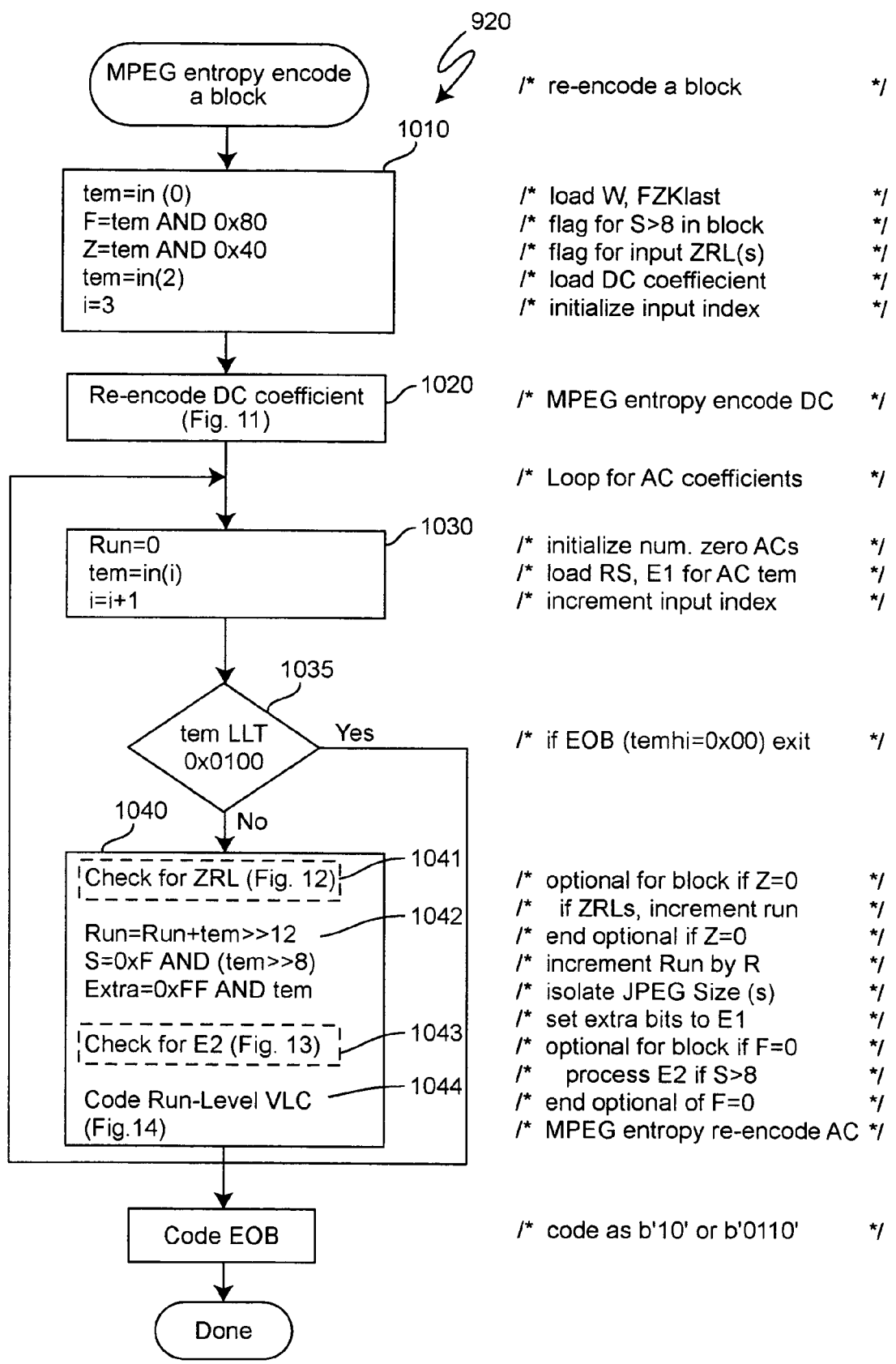
FIG. 10 is a detailed flow diagram of the process for entropy encoding of a block shown in FIG. 9.

Referring now to FIG. 9, the re-encoding of a macroblock is performed by first encoding the macroblock header by setting the macroblock address increment and the macrolock type (intra-only to indicate no prediction from previous or future images). The block counter is then initialized to zero as shown at 910. FIG. 10 details the following process which outputs MPEG VLCs and increments the block counter. The process then loops for each (e.g. 8×8) block in the (e.g. 16×16) macroblock; further reconciling the JPEG and MPEG data formats.

The MPEG entropy re-encoding process for a block begins with initialization 1010 which includes loading N and FZKlast from the packed intermediate code, flags for s>8 (F) and input ZRL(s), and the DC coefficient. The input index, i=3 is then set. The re-encoding step 1020 is detailed in FIG. 11, as will now be discussed.

Figure 11:
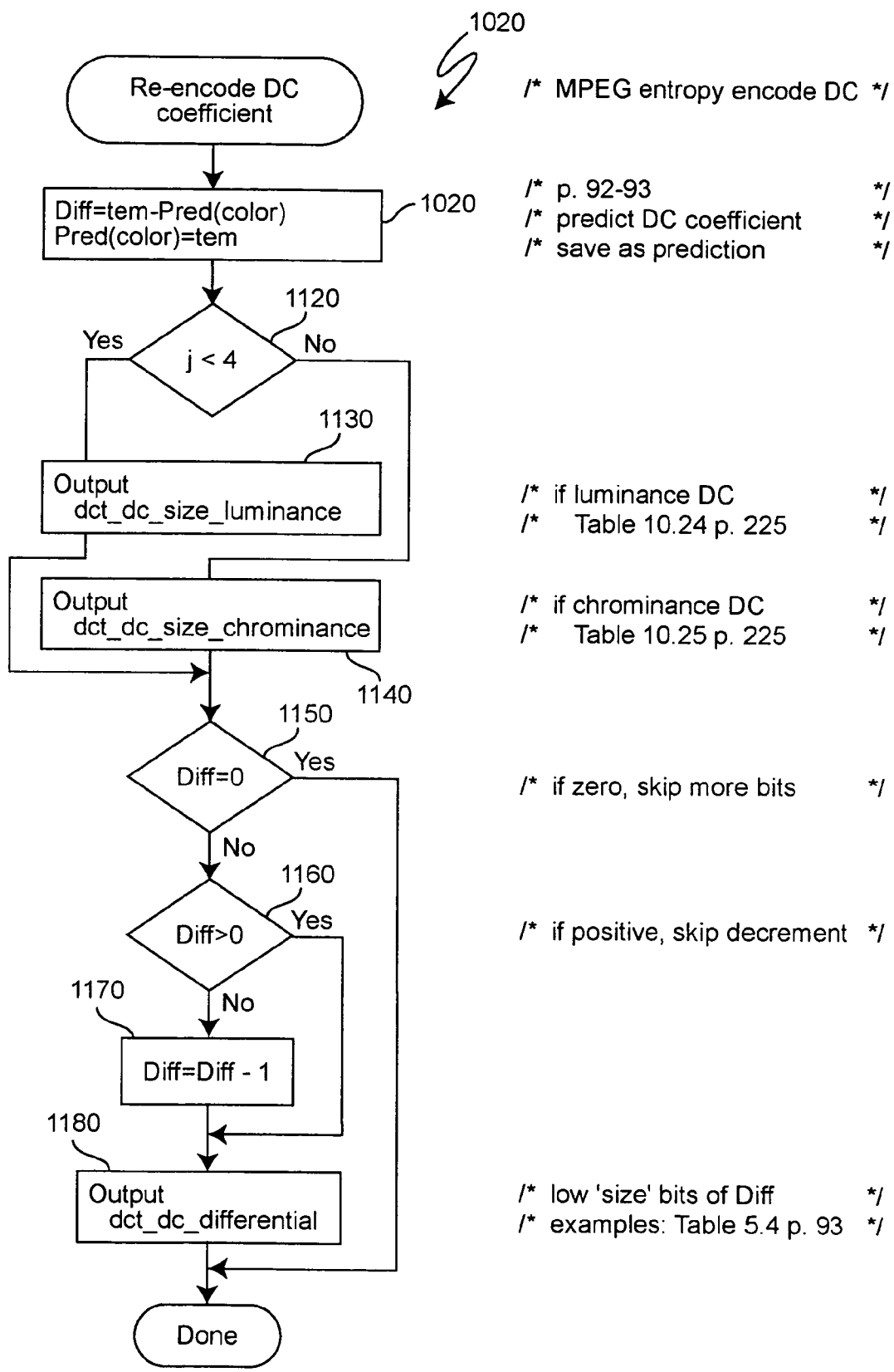
FIG. 11 is a detailed flow diagram of the process for re-encoding the DC coefficient as shown in FIG. 10

Referring now to FIG. 11, a DC coefficient, diff, is predicted and saved as a prediction at step 1110. If resealing of the quantized DC coefficient is necessary and has not been done during JPEG entropy decoding, the variable tem which contains the DC coefficient can be rescaled before the first step in 1110. Then, if j<4, which has been set and incremented as shown in FIG. 9 (the first four blocks being thus guaranteed to be luminance data), the value is a luminance DC value and a luminance code is derived from a table corresponding to table 10.24 in the above-incorporated MPEG Video Compression standard, as illustrated at 1130. If not, the value is a DC chrominance value and a chrominance code is derived from a table corresponding to table 10.25 of the same above-incorporated reference. The result, in either case (in accordance with the value of j) is then tested at 1150 and, if diff=0 no additional bits need be considered and outputting more bits may be skipped and the process of FIG. 11 is complete. If not, Diff is again tested at 1160 and, if positive, decrementing can be skipped and the differential DC coefficient code output at 1180. If not, Diff is decremented by one at 1170 and the differential DC coefficient is output at 1180. The process then continues at 1030 of FIG. 10 to initialize the MPEG chip hardware for the re-encoding of the AC coefficients. Preferably, i is set to zero, RS and E1 are loaded from the packed intermediate format for the ith AC term and I is incremented. (It should be noted that steps 1030, 1035, and 1040, as will now be described, are specific to use of the preferred packed intermediate data format as incorporated by reference above. However, those skilled in the art will be able to practice the invention successfully, if not optimally, using data in other formats from an understanding of the data organization described above with reference to FIG. 4 and the further detailed description in the above-incorporated patent application.) The data is then tested for an EOB (end-of-block) code which would indicate completion of coding at 1035. Assuming the re-encoding is not complete for the block, however, the process continues at 1040 which comprises a sequence of processes.

Figure 12:
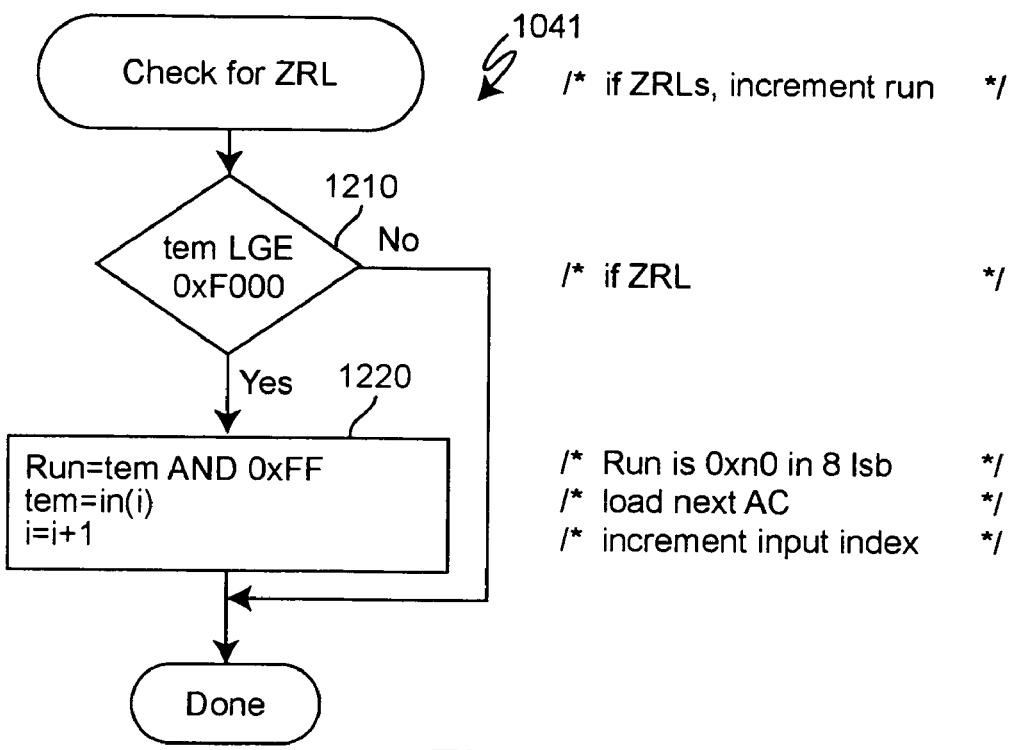
FIG. 12 is a detailed flow diagram of a process for checking for ZRL codes as shown in FIG. 10.

Specifically, step 1041 is optional if Z=0. If not, the run length is incremented as detailed in FIG. 12. As shown in FIG. 12, this process comprises testing for a ZRL at 1210 and, if so, the ZRL is evaluated, set and i is incremented at 1220. If there is no ZRL, the process is complete. In either case, the process resumes at 1042 of FIG. 10 in which the run length is incremented by R, the JPEG size (S) is isolated and the extra bits (E1) indicated thereby. The variable "extra" is set to E1. Next, and optionally if F=0 (which indicates that S is always 8 or less), a check is made for an E2 value in the intermediate data as detailed in FIG. 13.

Figure 13:
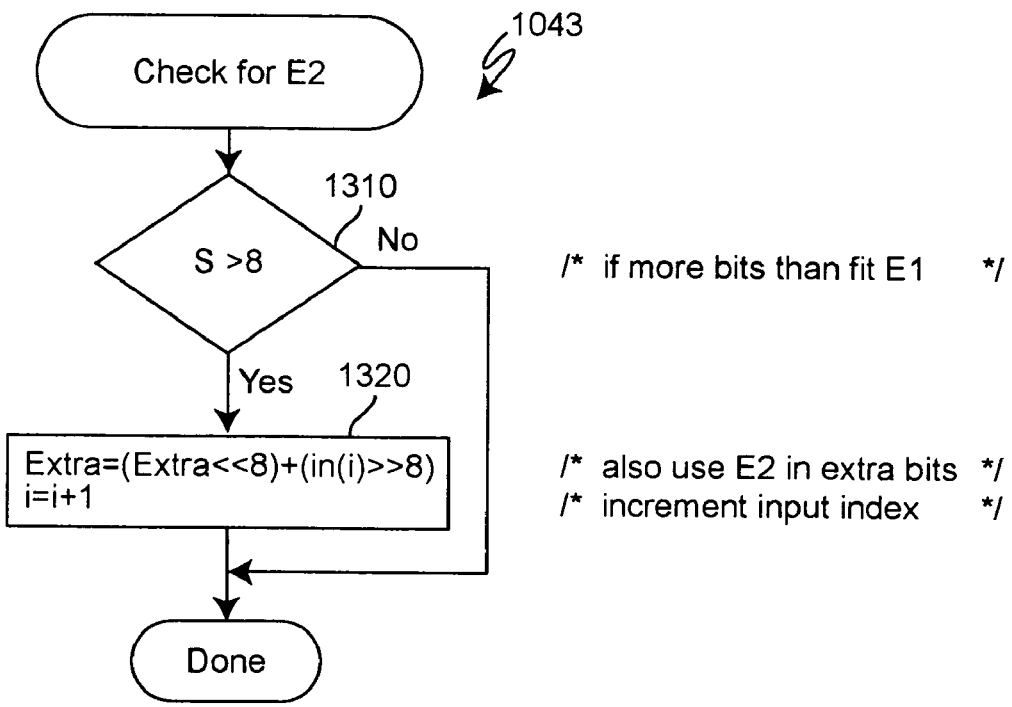
FIG. 13 is a detailed flow diagram of a process for checking for E2 codes as shown in FIG. 10, FIGS. 14A and 14B are detailed flow diagrams of alternative processes for coding run-level VLC codes as shown in FIG. 10, FIGS. 15A, 15B and 15C are detailed flow diagrams of alternative processes for outputting VLC codes as shown in FIG. 14A.

As illustrated in FIG. 13, if the value of S, isolated above, indicates that there are more bits than fit within field E1 of the intermediate data, as determined at 1310, the number of extra bits is evaluated using E2 and the input index, i, is incremented as shown at 1320. This process to check for E2 is complete at this point either by step 1320 being performed or skipped from step 1310.

Figure 14A:
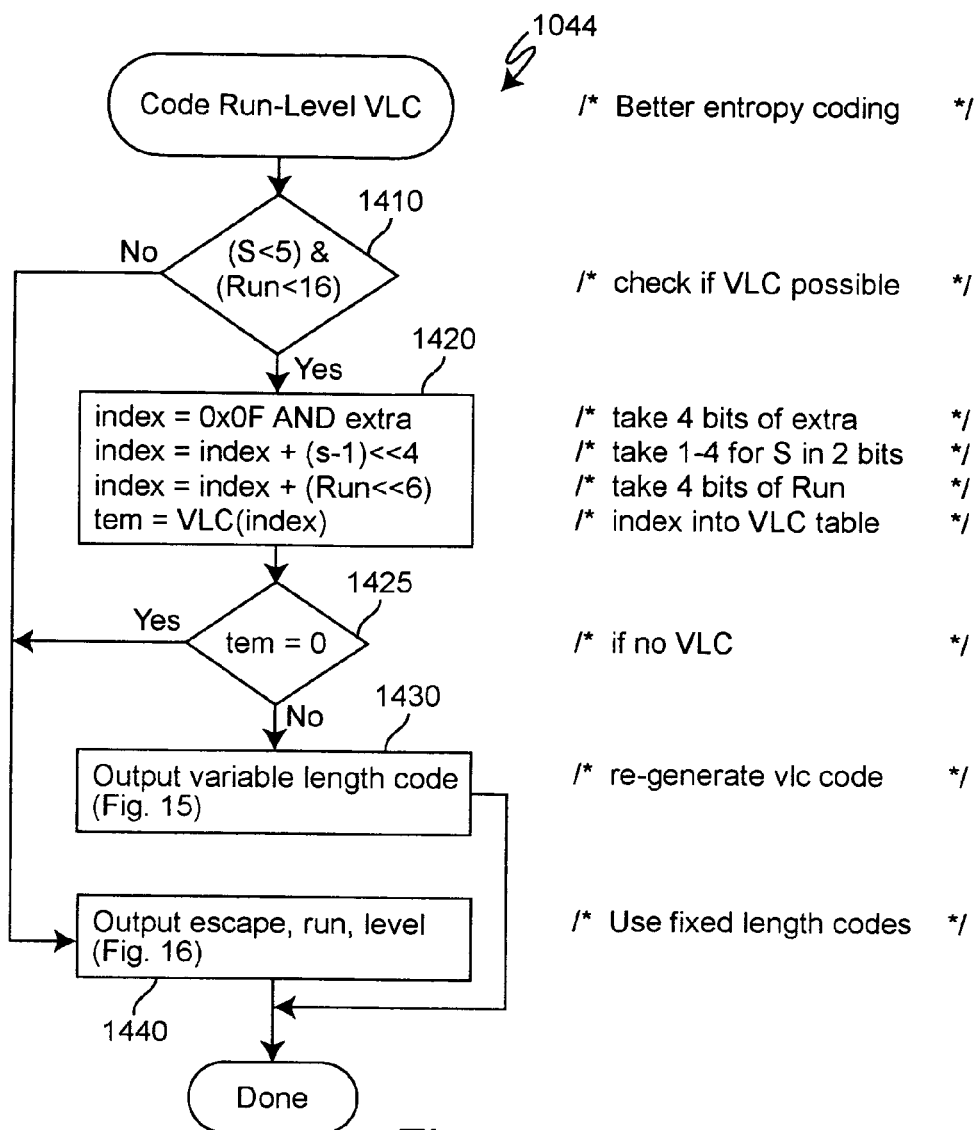
Figure 14B:
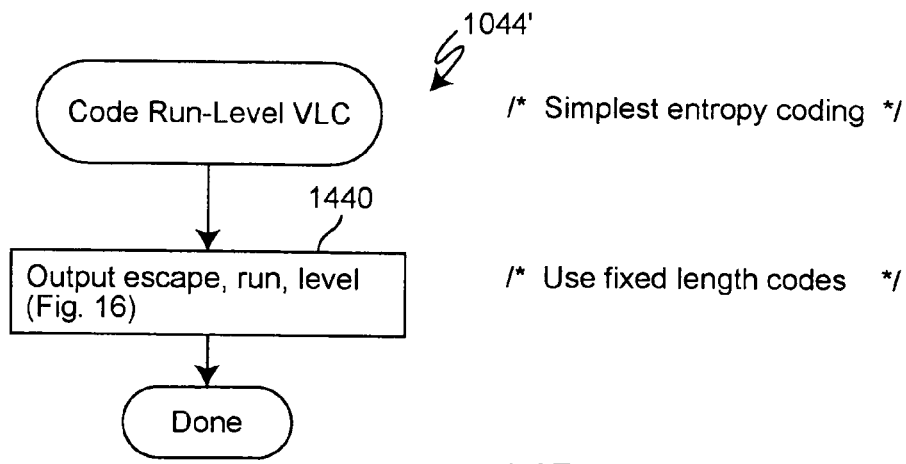

The process of FIG. 10 then resumes at 1044, detailed in FIG. 14A or 14B. The methodology of FIG. 14A is preferred as providing the best entropy coding. However, the methodology of FIG. 14B is much simpler albeit with some inefficiency in coding but which may, in general, may be adequate for image browsing or tolerable for achieving higher frequency image presentation while doing so. This latter methodology of FIG. 14B is limited for simplicity to outputting fixed length codes for exceptions to the variable length code table 0 and 1 discussed above and thus may be considered as a subset of the method of FIG. 14A and need not be further discussed.

In the better entropy coding methodology of FIG. 14A, a test is first made to determine if a VLC is possible by testing for S<5 and Run<16 at 1410. If not, no VLC is possible and an exception is output at 1440, much as in the methodology of FIG. 14B (e.g. the only execution speed penalty is for the test at 1410), a preferred method for which is detailed in FIG. 16.

More specifically, it will be recalled that the MPEG VLC tables only reflect runs of fifteen or less and size (number of extra bits) of four or less and only some of the run/level values which are in this range. Therefore, only if size, S, is four or less and the run is less than sixteen, is an effort made to look up the VLC code. If so, then preferably, the lower order four bits from the JPEG extra bits are used to initialize the final index into the table as shown at 1410. Thus S−1, shifted left by four bits becomes the next two bits in the index calculation. In addition, the four bits of run are shifted left/up by six bits to complete the index calculation as shown at 1420. (This, of course, assumes that the table being indexed has an entry for every possible run/level in this range. Other algorithms for calculating the index may be employed which are constructed to match table entries.) A variable, tem, is set to the result of looking up the VLC code at the computed index. If tem=0, as determined at 1425, no corresponding VLC code exists in the table and the fixed length run and level codes following an escape code as done in 1440, a preferred technique for which is detailed in FIG. 16. Otherwise the VLC code is output as shown at 1430, different alternative methods for which are detailed in FIG. 15A-15C, as will now be discussed.

Figure 15A:
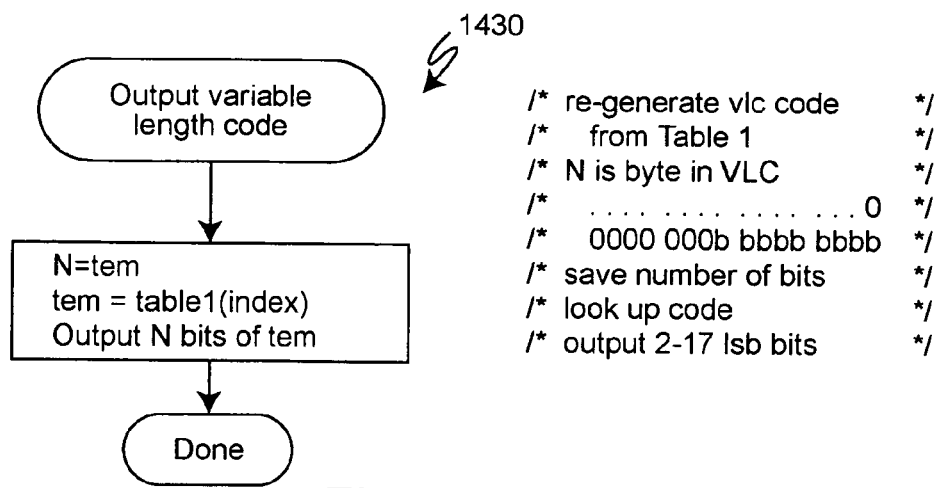

FIG. 15A illustrates a basic method for outputting VLC codes. N, the number of bits in the VLC code (shown as left-justified in Table I and converted to right-justification as shown in FIG. 15A), is set from tem which frees tem for further use. Tem is then set to four bytes in which the least significant N bits are the VLC code. Then the N bits are output as a compressed data string as is well-understood in the art.

Figure 15B:
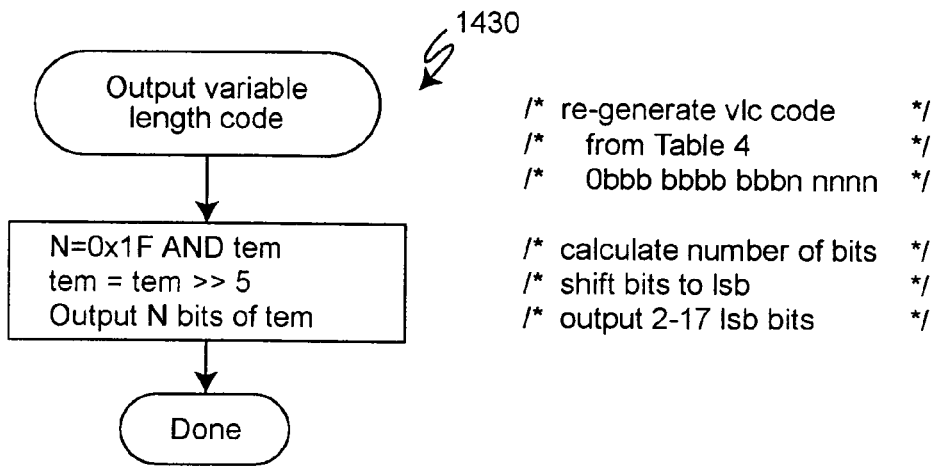

FIG. 15B illustrates a method for outputting VLC codes in a manner which allows reduction in storage requirements in the MPEG chip hardware and may be necessary, for that reason, in chips having limited storage capacity. In other words, it can be shown that when the VLC code is right-justified, no more than nine bits will be non-zero and thus can be placed in two bytes with data indicating the number of total bits in the remaining seven bits.

Specifically, Table IV below provides VLC tables 0 and 1 corresponding to those provided in Table I, above but in which only the least significant nine bits need to be saved since higher order bits are always zero. The nine LSB could be saved in the high bits of two bytes and the low bits could be the number (nnnnn) of bits (e.g. two bits to seventeen bits) in the code (bbbb bbbb b.nnnnn).

TABLE IV

| run/level | vlc table 0 | vlc table 1 |
|---|---|---|
| 0/0 (EOB) | .......10 | .....0110 |
| 0/1 | ......11s | ......10s |
| 0/2 | ....0100s | .....110s |
| 0/3 | ...00101s | ....0111s |
| 0/4 | .0000110s | ...11100s |
| 0/5 | 00100110s | ...11101s |
| 0/6 | 00100001s | ..000101s |
| 0/7 | 00 00001010s | ..000100s |
| 0/8 | 0000 00011101s | .1111011s |

TABLE IV-continued

| run/level | vlc table 0 | vlc table 1 |
|---|---|---|
| 0/9 | 0000 00011000s | .1111100s |
| 0/10 | 0000 00010011s | 00100011s |
| 0/11 | 0000 00010000s | 00100010s |
| 0/12 | 00000 00011010s | 11111010s |
| 0/13 | 00000 00011001s | 11111011s |
| 0/14 | 00000 00011000s | 11111110s |
| 0/15 | 00000 00010111s | 11111111s |
| 0/16 | 000000 00011111s | 000000 00011111s |
| 0/17 | 000000 00011110s | 000000 00011110s |
| 0/18 | 000000 00011101s | 000000 00011101s |
| 0/19 | 000000 00011100s | 000000 00011100s |
| 0/20 | 000000 00011011s | 000000 00011011s |
| 0/21 | 000000 00011010s | 000000 00011010s |
| 0/22 | 000000 00011001s | 000000 00011001s |
| 0/23 | 000000 00011000s | 000000 00011000s |
| 0/24 | 000000 00010111s | 000000 00010111s |
| 0/25 | 000000 00010110s | 000000 00010110s |
| 0/26 | 000000 00010101s | 000000 00010101s |
| 0/27 | 000000 00010100s | 000000 00010100s |
| 0/28 | 000000 00010011s | 000000 00010011s |
| 0/29 | 000000 00010010s | 000000 00010010s |
| 0/30 | 000000 00010001s | 000000 00010001s |
| 0/31 | 000000 00010000s | 000000 00010000s |
| 0/32 | 0000000 00011000s | 0000000 00011000s |
| 0/33 | 0000000 00010111s | 0000000 00010111s |
| 0/34 | 0000000 00010110s | 0000000 00010110s |
| 0/35 | 0000000 00010101s | 0000000 00010101s |
| 0/36 | 0000000 00010100s | 0000000 00010100s |
| 0/37 | 0000000 00010011s | 0000000 00010011s |
| 0/38 | 0000000 00010010s | 0000000 00010010s |
| 0/39 | 0000000 00010001s | 0000000 00010001s |
| 0/40 | 0000000 00010000s | 0000000 00010000s |
| 1/1 | .....011s | .....010s |
| 1/2 | ..000110s | ...00110s |
| 1/3 | 00100101s | .1111001s |
| 1/4 | 00 00001100s | 00100111s |
| 1/5 | 0000 00011011s | 00100000s |
| 1/6 | 00000 00010110s | 00000 00010110s |
| 1/7 | 00000 00010101s | 00000 00010101s |
| 1/8 | 0000000 00011111s | 0000000 00011111s |
| 1/9 | 0000000 00011110s | 0000000 00011110s |
| 1/10 | 0000000 00011101s | 0000000 00011101s |
| 1/11 | 0000000 00011100s | 0000000 00011100s |
| 1/12 | 0000000 00011011s | 0000000 00011011s |
| 1/13 | 0000000 00011010s | 0000000 00011010s |
| 1/14 | 0000000 00011001s | 0000000 00011001s |
| 1/15 | 00000000 00010011s | 00000000 00010011s |
| 1/16 | 00000000 00010010s | 00000000 00010010s |
| 1/17 | 00000000 00010001s | 00000000 00010001s |
| 1/18 | 00000000 00010000s | 00000000 00010000s |
| 2/1 | ....0101s | ...00101s |
| 2/2 | .0000100s | .0000111s |
| 2/3 | 00 00001011s | 11111100s |
| 2/4 | 0000 00010100s | 00 00001100s |
| 2/5 | 00000 00010100s | 00000 00010100s |
| 3/1 | ...00111s | ...00111s |
| 3/2 | 00100100s | 00100110s |
| 3/3 | 0000 00011100s | 0000 00011100s |
| 3/4 | 00000 00010011s | 00000 00010011s |
| 4/1 | ...00110s | ..000110s |
| 4/2 | 00 00001111s | 11111101s |
| 4/3 | 0000 00010010s | 0000 00010010s |
| 5/1 | ..000111s | ..000111s |
| 5/2 | 00 00001001s | 0 00000100s |
| 5/3 | 00000 00010010s | 00000 00010010s |
| 6/1 | ..000101s | .0000110s |
| 6/2 | 0000 00011110s | 0000 00011110s |
| 6/3 | 00000000 00010100s | 00000000 00010100s |
| 7/1 | ..000100s | .0000100s |
| 7/2 | 0000 00010101s | 0000 00010101s |
| 8/1 | .0000101s | .0000101s |
| 8/2 | 0000 00010001s | 0000 00010001s |
| 9/1 | .0000101s | .1111000s |
| 9/2 | 00000 00010001s | 00000 00010001s |
| 10/1 | 00100111s | .1111010s |
| 10/2 | 00000 00010000s | 00000 00010000s |

TABLE IV-continued

| run/level | vlc table 0 | vlc table 1 |
|---|---|---|
| 11/1 | 00100011s | 00100001s |
| 11/2 | 00000000 00011010s | 00000000 00011010s |
| 12/1 | 00100010s | 00100101s |
| 12/2 | 00000000 00011001s | 00000000 00011001s |
| 13/1 | 00100000s | 00100100s |
| 13/2 | 00000000 00011000s | 00000000 00011000s |
| 14/1 | 00 00001110s | 0 00000101s |
| 14/2 | 00000000 00010111s | 00000000 00010111s |
| 15/1 | 00 00001101s | 0 00000111s |
| 15/2 | 00000000 00010110s | 00000000 00010110s |
| 16/1 | 00 00001000s | 00 00001101s |
| 16/2 | 00000000 00010101s | 00000000 00010101s |
| 17/1 | 0000 00011111s | 0000 00011111s |
| 18/1 | 0000 00011010s | 0000 00011010s |
| 19/1 | 0000 00011001s | 0000 00011001s |
| 20/1 | 0000 00010111s | 0000 00010111s |
| 21/1 | 0000 00010110s | 0000 00010110s |
| 22/1 | 00000 00011111s | 00000 00011111s |
| 23/1 | 00000 00011110s | 00000 00011110s |
| 24/1 | 00000 00011101s | 00000 00011101s |
| 25/1 | 00000 00011100s | 00000 00011100s |
| 26/1 | 00000 00011011s | 00000 00011011s |
| 27/1 | 00000000 00011111s | 00000000 00011111s |
| 28/1 | 00000000 00011110s | 00000000 00011110s |
| 29/1 | 00000000 00011101s | 00000000 00011101s |
| 30/1 | 00000000 00011100s | 00000000 00011100s |
| 31/1 | 00000000 00011011s | 00000000 00011011s |

Figure 15C:
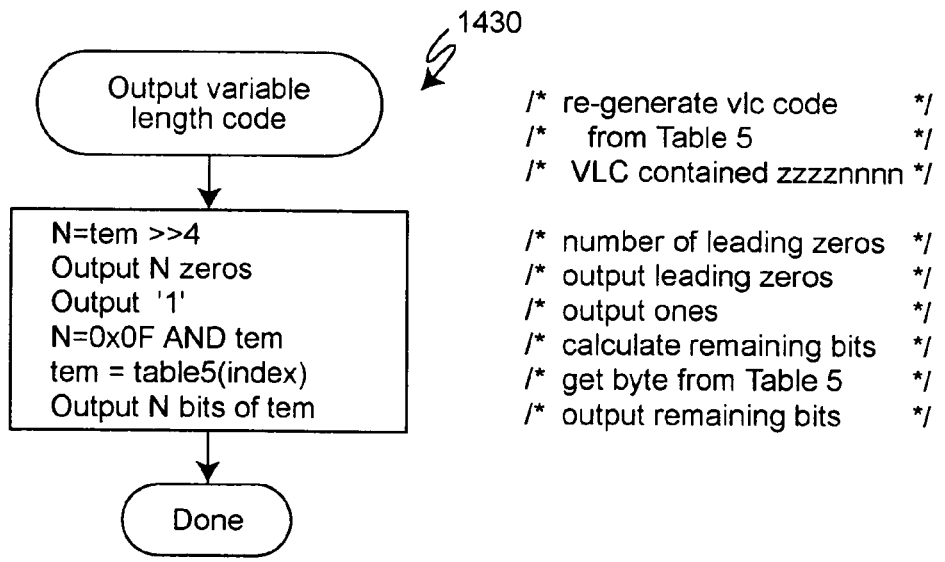

FIG. 15C illustrates an alternative technique of outputting VLC codes providing convenience of storage of VLC/Huffman codes. In other words, the VLC codes can be split into a segment which always ends with the left-most "1" in the code and the remaining bits to the right of the left-most "1" are thus guaranteed to fit in a single byte (eight bits).

Table V, below shows how the high byte could have the number of leading zeros in the high four bits and the number of remaining bits in the low four bits (zzzz nnnn) The second byte includes the bits following the first 1. The bits designated '.' can either be in the most significant or least significant bits depending upon how the code is stored in the table.

TABLE V

Huffman codes stored in a byte. Leading zeros and first leading 1 generated seperately. Another table scores the number of leading zeros and number of valid bits in the byte (zzzz nnnn).

| run/level | vlc table 0 | vlc table 1 |
|---|---|---|
| 0/0 | 1 0....... | 01 10...... |
| 0/1 | 1 1s...... | 1 0s...... |
| 0/2 | 01 00s..... | 1 10s..... |
| 0/3 | 001 01s..... | 01 11s..... |
| 0/4 | 00001 10s..... | 1 1100s... |
| 0/5 | 001 1101s... | 1 1101s... |
| 0/6 | 001 00001s.. | 0001 01s..... |
| 0/7 | 0000001 010s.... | 0001 00s..... |
| 0/8 | 00000001 1101s... | 1 111011s. |
| 0/9 | 00000001 1100s... | 1 111100s. |
| 0/10 | 00000001 0011s... | 001 00011s.. |
| 0/11 | 00000001 0000s... | 001 00010s.. |
| 0/12 | 0 00000001 1010s... | 1 1111010s |
| 0/13 | 0 00000001 1001s... | 1 1111011s |
| 0/14 | 0 00000001 1000s... | 1 1111110s |
| 0/15 | 0 00000001 0111s... | 1 1111111s |
| 0/16 | 00 00000001 1111s... | 00 00000001 1111s... |
| 0/17 | 00 00000001 1110s... | 00 00000001 1110s... |
| 0/18 | 00 00000001 1101s... | 00 00000001 1101s... |

TABLE V-continued

Huffman codes stored in a byte. Leading zeros and first leading 1 generated seperately. Another table scores the number of leading zeros and number of valid bits in the byte (zzzz nnnn).

| run/level | vlc table 0 | vlc table 1 |
|---|---|---|
| 0/19 | 00 00000001 1100s... | 00 00000001 1100s... |
| 0/20 | 00 00000001 1011s... | 00 00000001 1011s... |
| 0/21 | 00 00000001 1010s... | 00 00000001 1010s... |
| 0/22 | 00 00000001 1001s... | 00 00000001 1001s... |
| 0/23 | 00 00000001 1000s... | 00 00000001 1000s... |
| 0/24 | 00 00000001 0111s... | 00 00000001 0111s... |
| 0/25 | 00 00000001 0110s... | 00 00000001 0110s... |
| 0/26 | 00 00000001 0101s... | 00 00000001 0101s... |
| 0/27 | 00 00000001 0100s... | 00 00000001 0100s... |
| 0/28 | 00 00000001 0011s... | 00 00000001 0011s... |
| 0/29 | 00 00000001 0010s... | 00 00000001 0010s... |
| 0/30 | 00 00000001 0001s... | 00 00000001 0001s... |
| 0/31 | 00 00000001 0000s... | 00 00000001 0000s... |
| 0/32 | 000 00000001 1000s... | 000 00000001 1000s... |
| 0/33 | 000 00000001 0111s... | 000 00000001 0111s... |
| 0/34 | 000 00000001 0110s... | 000 00000001 0110s... |
| 0/35 | 000 00000001 0101s... | 000 00000001 0101s... |
| 0/36 | 000 00000001 0100s... | 000 00000001 0100s... |
| 0/37 | 000 00000001 0011s... | 000 00000001 0011s... |
| 0/38 | 000 00000001 0010s... | 000 00000001 0010s... |
| 0/39 | 000 00000001 0001s... | 000 00000001 0001s... |
| 0/40 | 000 00000001 0000s... | 000 00000001 0000s... |
| 1/1 | 01 1s...... | 01 0s...... |
| 1/2 | 0001 10s..... | 001 10s..... |
| 1/3 | 001 00101s.. | 1 111001s. |
| 1/U | 0000001 100s ... | 001 00111s.. |
| 1/5 | 00000001 1011s... | 001 00000s.. |
| 1/6 | 0 00000001 0110s... | 0 00000001 0110s... |
| 1/7 | 0 00000001 0101s... | 0 00000001 0101s... |
| 1/8 | 000 00000001 1111s... | 000 00000001 1111s... |
| 1/9 | 000 00000001 1110s... | 000 00000001 1110s... |
| 1/10 | 000 00000001 1101s... | 000 00000001 1101s... |
| 1/11 | 000 00000001 1100s... | 000 00000001 1100s... |
| 1/12 | 000 00000001 1011s... | 000 00000001 1011s... |
| 1/13 | 000 00000001 1010s... | 000 00000001 1010s... |
| 1/14 | 000 00000001 1001s... | 000 00000001 1001s... |
| 1/15 | 0000 00000001 0011s... | 0000 00000001 0011s... |
| 1/16 | 0000 00000001 0010s... | 0000 00000001 0010s... |
| 1/17 | 0000 00000001 0001s... | 0000 00000001 0001s... |
| 1/18 | 0000 00000001 0000s... | 0000 00000001 0000s... |
| 2/1 | 01 01s..... | 001 01s..... |
| 2/2 | 00001 00s..... | 00001 11s..... |
| 2/3 | 0000001 011s.... | 1 1111100s |
| 2/4 | 00000001 0100s... | 0000001 100s.... |
| 2/5 | 0 00000001 0100s... | 0 00000001 0100s... |
| 3/1 | 001 11s..... | 001 11s..... |
| 3/2 | 001 00100s.. | 001 00110s.. |
| 3/3 | 00000001 1100s... | 00000001 1100s... |
| 3/4 | 0 00000001 0011s... | 0 00000001 0011s... |
| 4/1 | 001 10s..... | 0001 10s..... |
| 4/2 | 0000001 111s.... | 1 1111101s |
| 4/3 | 00000001 0010s... | 00000001 0010s... |
| 5/1 | 0001 11s..... | 0001 11s..... |
| 5/2 | 0000001 001s.... | 0000001 00s..... |
| 5/3 | 0 00000001 0010s... | 0 00000001 0010s... |
| 6/1 | 0001 01s..... | 00001 10s..... |
| 6/2 | 00000001 1110s... | 00000001 1110s... |
| 6/3 | 0000 00000001 0100s... | 0000 00000001 0100s... |
| 7/1 | 0001 00s..... | 00001 0s..... |
| 7/U | 00000001 0101s... | 00000001 0101s... |
| 8/1 | 00001 11s..... | 00001 01s..... |
| 8/2 | 00000001 0001s... | 00000001 0001s... |
| 9/1 | 00001 01s..... | 1 111000s. |
| 9/2 | 0 00000001 0001s... | 0 00000001 0001s... |
| 10/1 | 001 00111s.. | 1 111010s. |
| 10/2 | 0 00000001 0000s... | 0 00000001 0000s... |
| 11/1 | 001 00011s.. | 001 00001s.. |
| 11/2 | 0000 00000001 1010s... | 0000 00000001 1010s... |
| 12/1 | 001 00010s.. | 001 00101s.. |
| 12/2 | 0000 00000001 1001s... | 0000 00000001 1001s... |
| 13/1 | 001 00000s.. | 001 00100s.. |

TABLE V-continued

Huffman codes stored in a byte. Leading
zeros and first leading 1 generated seperately.
Another table scores the number of leading zeros and
number of valid bits in the byte (zzzz nnnn).

| run/level | vlc table 0 | vlc table 1 |
|---|---|---|
| 13/2 | 0000 00000001 1000s... | 0000 00000001 1000s... |
| 14/1 | 0000001 110s.... | 0000001 01s..... |
| 14/2 | 0000 00000001 0111s... | 0000 00000001 0111s... |
| 15/1 | 0000001 101s.... | 0000001 11s..... |
| 15/2 | 0000 00000001 0110s... | 0000 00000001 0110s... |
| 16/1 | 0000001 000s.... | 0000001 101s..... |
| 16/2 | 0000 00000001 0101s... | 0000 00000001 0101s... |
| 17/1 | 00000001 1111s... | 00000001 1111s... |
| 18/1 | 00000001 1010s... | 00000001 1010s... |
| 19/1 | 00000001 1001s... | 00000001 1001s... |
| 20/1 | 00000001 0111s... | 00000001 0111s... |
| 21/1 | 00000001 0110s... | 00000001 0110s... |
| 22/1 | 0 00000001 1111s... | 0 00000001 1111s... |
| 23/1 | 0 00000001 1110s... | 0 00000001 1110s... |
| 24/1 | 0 00000001 1101s... | 0 00000001 1101s... |
| 25/1 | 0 00000001 1100s... | 0 00000001 1100s... |
| 26/1 | 0 00000001 1011s... | 0 00000001 1011s... |
| 27/1 | 0000 00000001 1111s... | 0000 00000001 1111s... |
| 28/1 | 0000 00000001 1110s... | 0000 00000001 1110s... |
| 29/1 | 0000 00000001 1101s... | 0000 00000001 1101s... |
| 30/1 | 0000 00000001 1100s... | 0000 00000001 1100s... |
| 31/1 | 0000 00000001 1011s... | 0000 00000001 1011s... |

It should be note that except for the 0/0 run/level, the EOB code and the escape code, the sign bit "s" could be removed so that the non-zero bits could always be fit into an eight-bit byte; yielding additional savings in storage space for the VLC tables as shown in Table V. This potentially allows additional storage space to be provided on a given MPEG chip for image data (e.g. for particularly large images).

It should be observed that the Huffman/VLC lookup tables can be significantly reduced by observing that all runs greater than 15 must have gone through the ZRL path. Once in that path the next non-zero coefficient could be handled with special cases only for S=1 & R<32 and S=2 & R=16 instead of up to S=4. This would cut the tables on the non-ZRL path in half.

Figure 16:
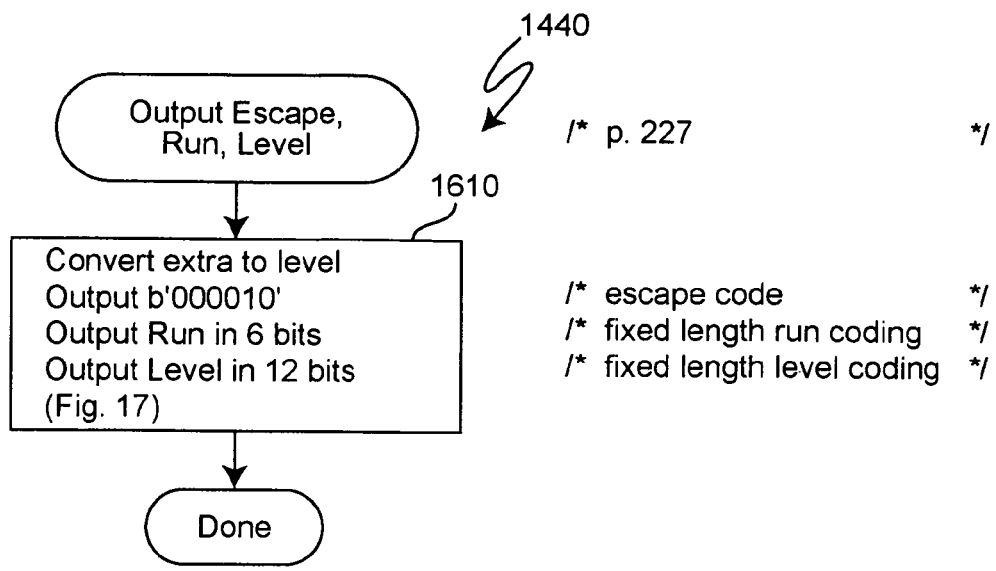
FIG. 16 is a flow diagram for outputting escape, run and level codes as shown in FIGS. 14A and 14B.

FIG. 16 illustrates a preferred technique for outputting exceptions as a fixed length code as part of the above-discussed routines of FIGS. 14A and 14B. The first step is to convert the extra bits (e.g. the JPEG coefficient value represented by the size and extra bits) to the appropriate MPEG level, preferably as detailed in FIG. 17. The next step is to output the fixed six-bit escape code. Finally, the run is output in six bits followed by the level which is output in twelve bits.

Figure 17:
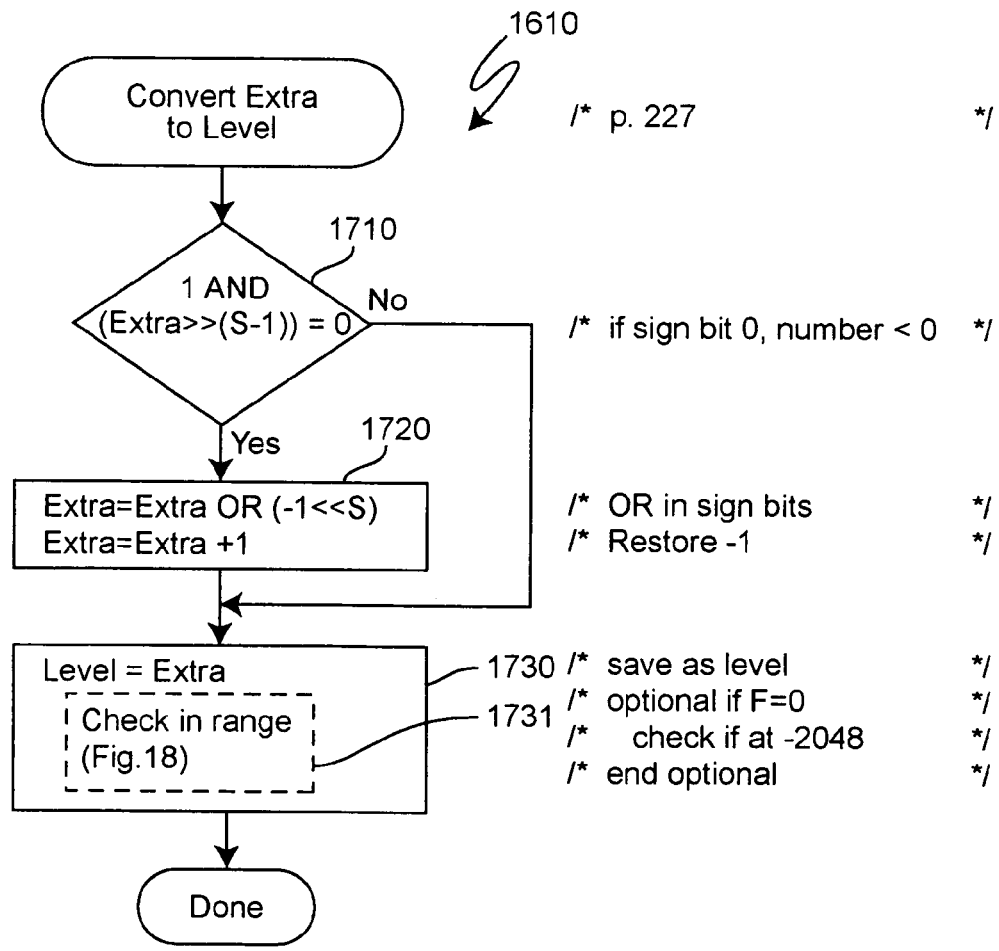
FIG. 17 is a flow diagram for converting JPEG extra bit codes to MPEG level codes as shown in FIG. 16, and FIGS. 18A and 18B are flow diagrams for checking the range of the level value for JPEG data and the general case, respectively, in the process shown in FIG. 17.
Figure 18A:
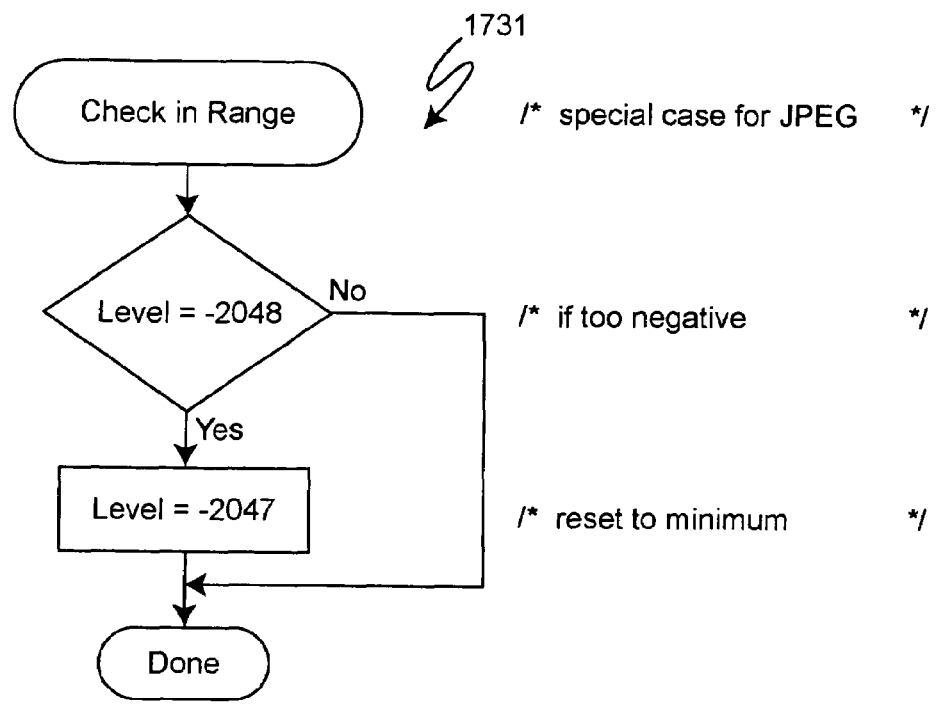
Figure 18B:
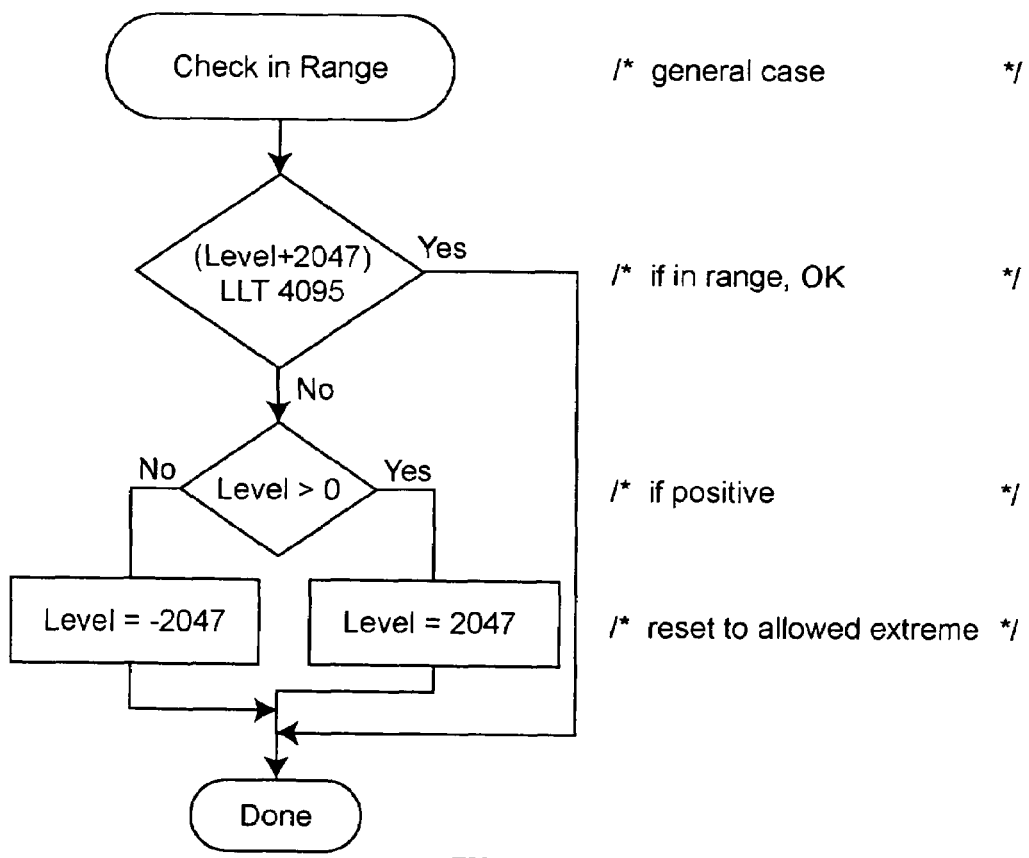

FIG. 17 illustrates a preferred technique for converting the JPEG extra bits into the MPEG level. Assuming that the extra bits are right-justified, then S−1 shifts to the right will position the first significant bit of the extra bits in the least significant bit position where it can be tested. If the tested bit is zero, the number is negative and sign bits must be ORed in to the higher order bits. This is done by shifting −1 to the left by S bits and then ORing in to the extra bits number. Adding +1 converts it into the true negative number. Then "level" is set to "extra" in all cases. Optionally, the range can be checked as shown in FIG. 18A or 18B. In JPEG, a level of −2048 is possible and should be tested in order to reset it to the largest negative number permitted in MPEG (−2047) as shown in FIG. 18A. Alternatively, both positive and negative levels can be checked to confirm that they are in the range of −2047 to +2047 as shown in FIG. 18B.

In view of the foregoing, it is seen that the invention provides a technique for exploiting the MPEG hardware chip speed for browsing JPEG images. The software JPEG processing load is reduced by at least half during transcoding by transfer of processing to the hardware MPEG chip. The hardware MPEG chip runs autonomously with little interaction with the processor and in parallel with the processor and, as specialized hardware, at accelerated processing speed. Thus high image presentation rates and/or image sizes for independent images can be achieved even when limited by (reduced) JPEG software processing, while improvements in general purpose processors which can be foreseen will thus allow a fourfold to tenfold or greater processing speed gain, corresponding to the current hardware speed advantage over software.

Similarly, an MPEG encoder could be used to process high-resolution still images and later, within the embedded processor, converted to JPEG compliant data. It would be highly desirable, in such a case, to have disabled the oddification. Further, in such a case, the quantization tables being JPEG compliant, no rescaling would be required. Such an application is particularly likely in view of the current proliferation of chips having both encoders and decoders which are MPEG compliant, as distinguished from chips having both JPEG and MPEG compliant capabilities; requiring more chip space and unavoidable additional cost.

Furthermore, the MPEG motion compensation and P-frame predictive capability may allow additional desirable compression, especially for large images with substantial redundancy allowing limitation of resolution loss. That is, if the distortion is too great, a macroblock can always be encoded independently within a portion of the image using the MPEG I-frame method. By the same token, if the browsing is stopped on an image, the correct JPEG image data can be derived from conventional JPEG software techniques and substituted for the MPEG-decoded image data for display or even in memory before or after a browsed image or portion thereof is viewed. For example, data could be substituted in memory before or after display for respective tiles of a map which may be later recalled in a desired combination for zooming or panning simulation display (e.g. in a video game) whether or not browsing is stopped on an image.

When the JPEG compressed high resolution image has many more pixels than can be shown at once on the output device, browsing within the image (ie. panning, scrolling and combinations resulting in oblique motion) generates known translations which are represented by coordinates from which motion vectors can be easily derived. These can be converted into MPEG motion vectors without using the motion estimation hardware so that only the incremental portion of the JPEG image need be compressed. The portion already in the previous decoded frame is a perfect prediction particularly if the motion vectors are restricted to multiples of 8 translations vertically and horizontally (i.e. the 8×8 block boundaries). Thus the new parts of the image match the original JPEG block boundaries for rapid browsing within an image. Since the JPEG compressed data is only partially decoded (e.g. entropy decoded), the uncompressed data of the new frame is not available for the motion estimation hardware. For slower browsing within an image, fewer blocks of the JPEG image are newly exposed so that the JPEG block boundaries can be shifted to generate packed format to match pixel or even sub-pixel shifts. These types of shifts can be accomplished by, for example, the technique described in U.S. patent application Ser. No. 09/588,477 which is assigned to the assignee of the present application and hereby fully incorporated by reference. Such browsing would be particularly useful for wireless telephones (e.g. "cell phones") and other small displays or for video games that restrict the field of view.

While the invention has been described in terms of a single preferred embodiment having variant forms, those skilled in the art will recognize that the invention can be practiced with modification within the spirit and scope of the appended claims.

Having thus described our invention, what we claim as new and desire to secure by Letters Patent is as follows:

1. A method for improving decoding throughput of compressed image data, said method comprising steps of
    partially decompressing said compressed image data to form partially decompressed data in an intermediate code, said compressed image data being incompatible with a hardware image decoder,
    recompressing said intermediate code in accordance with a compressed format compatible with said hardware image decoder forming recompressed image data, said recompressing step being performed in a lossy manner, and
    decoding said recompressed image data with a said hardware image decoder, whereby software processing for decoding of said compressed image data is reduced by hardware decoding of said recompressed image data.

2. A method as recited in claim 1, wherein said partially decompressed data is a packed intermediate code.

3. A method as recited in claim 2 wherein said packed code contains JPEG RS symbols and extra bits.

4. A method as recited in claim 3 wherein said packed format is of the form:

|N,FZKlast|DC|[ZRL, 0xn0]|RS,E1|[E2, 0x00]| . . .
    |EOB, 0x- -|[0x- - -]|.

5. The method as recited in claim 1, comprising the further steps of
    decoding said compressed image data by software processing, and
    substituting results of said decoding said compressed image data by software processing step for results of said hardware decoding.

6. The method as recited in claim 5, including the further step of disabling oddification of said hardware image decoder.

7. The method as recited in claim 6, wherein said hardware image decoder is an MPEG video decoder.

8. The method as recited in claim 1 wherein said recompressed data is MPEG compressed data.

9. The method as recited in claim 1, wherein said step of partially decoding includes entropy decoding.

10. The method as recited in claim 1, including the further step of disabling oddification of said hardware image decoder.

11. The method as recited in claim 10, wherein said hardware image decoder is an MPEG video decoder.

12. The method as recited in claim 1 wherein said method is performed in a wireless telephone or video game.

13. The method as recited in claim 1 wherein said recompressed data includes motion vectors computed from translation or panning coordinates.

14. The method as recited in claim 13 wherein said motion vectors are restricted to JPEG block boundaries.

15. The method as recited in claim 13 wherein said recompressed data includes predictive coding.

16. The method recited in claim 1 wherein said compressed format compatible with said hardware image decoder is not compatible from outside said hardware image decoder.

* * * * *